United States Patent
Xue et al.

(10) Patent No.: US 10,051,610 B2
(45) Date of Patent: Aug. 14, 2018

(54) SCHEMES RELATED TO RESOURCE ALLOCATION, DISCOVERY AND SIGNALING IN D2D SYSTEMS

(71) Applicant: Samsung Electronics Co., Ltd., Suwon-si, Gyeonggi-do (KR)

(72) Inventors: Peng Xue, Hwaseong-si (KR); Hyun-Seok Ryu, Yongin-si (KR); Seung-Hoon Park, Seoul (KR); Hyun-Kyu Yu, Suwon-si (KR); Cheol Jeong, Seongnam-si (KR); Sang-Won Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 14/707,294

(22) Filed: May 8, 2015

(65) Prior Publication Data

US 2015/0327315 A1    Nov. 12, 2015

(30) Foreign Application Priority Data

May 9, 2014   (KR) .................. 10-2014-0055981
Aug. 21, 2014  (KR) .................. 10-2014-0109236
(Continued)

(51) Int. Cl.
*H04W 72/04*    (2009.01)
*H04L 5/00*      (2006.01)
(Continued)

(52) U.S. Cl.
CPC ....... *H04W 72/0406* (2013.01); *H04L 5/0005* (2013.01); *H04L 5/0044* (2013.01);
(Continued)

(58) Field of Classification Search
None
See application file for complete search history.

(56) References Cited

U.S. PATENT DOCUMENTS 8,121,097 B2    2/2012  Li et al.
2009/0013081 A1*  1/2009  Laroia ................ H04W 8/005
                                            709/228
(Continued)

FOREIGN PATENT DOCUMENTS

EP      2 685 779 A1    1/2014
WO   2013/138985 A1    9/2013

OTHER PUBLICATIONS

LG Electronics "Discussion on resource allocation for Type 2B discovery"; R1-143183; 3GPP TSG RAN WG1 Meeting #78; Dresden, Germany, Aug. 18-22, 2014; 7 pages; 3rd Generation Partnership Project (3GPP); Mobile Competence Centre; 650, Route des Lucioles; F-06921 Sophia-Antipolis Cedex; France.*

(Continued)

*Primary Examiner* — Brian Roberts
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for performing device-to-device (D2D) communication by an in-coverage user equipment (UE) in a cellular communication system is provided. The method includes receiving a scheduling grant through a downlink control channel from a base station (evolved Node B (eNB)) and transmitting a scheduling assignment (SA) message in an SA region of a D2D communication frame and data in a data region of the D2D communication frame, based on the scheduling grant, wherein the scheduling grant indicates a resource pattern for transmission (RPT) corresponding to a set of resource units or a subset of a resource unit in a time domain and a frequency domain that is used for transmission of the data.

14 Claims, 30 Drawing Sheets

(30) Foreign Application Priority Data

Sep. 25, 2014 (KR) ........................ 10-2014-0128401
Nov. 6, 2014 (KR) ........................ 10-2014-0153553

(51) Int. Cl.
| | |
|---|---|
| *H04W 8/00* | (2009.01) |
| *H04W 88/02* | (2009.01) |
| *H04W 88/08* | (2009.01) |
| *H04W 72/12* | (2009.01) |
| *H04W 76/14* | (2018.01) |

(52) U.S. Cl.
CPC .......... *H04W 8/005* (2013.01); *H04W 72/042* (2013.01); *H04W 72/1289* (2013.01); *H04W 76/14* (2018.02); *H04W 88/02* (2013.01); *H04W 88/08* (2013.01)

(56) References Cited

U.S. PATENT DOCUMENTS

| | | | |
|---|---|---|---|
| 2010/0110929 A1* | 5/2010 | Li | H04B 1/7143 370/254 |
| 2011/0085513 A1 | 4/2011 | Chen et al. | |
| 2013/0016629 A1* | 1/2013 | Mallik | H04W 8/005 370/255 |
| 2013/0303223 A1* | 11/2013 | Patil | H04W 8/005 455/517 |
| 2014/0056220 A1* | 2/2014 | Poitau | H04W 40/246 370/328 |
| 2014/0269558 A1* | 9/2014 | Sartori | H04W 48/16 370/329 |
| 2016/0095099 A1* | 3/2016 | Yang | H04L 5/00 370/330 |

OTHER PUBLICATIONS

Qualcomm Incorporated "Resource allocation for Type 1 D2D discovery"; R1-142958; 3GPP TSG-RAN WG1 #78, Aug. 18-22, 2014; Dresden, Germany; 8 pages; 3rd Generation Partnership Project (3GPP); Mobile Competence Centre; 650, Route des Lucioles; F-06921 Sophia-Antipolis Cedex; France.*

Alcatel-Lucent Shanghai Bell et al "Discovery Resource selection for Type 1 resource allocation"; R1-143020; 3GPP TSG RAN WG1 Meeting #78; Dresden, Germany, Aug. 18-22, 2014; 5 pages; 3rd Generation Partnership Project (3GPP); Mobile Competence Centre; 650, Route des Lucioles; F-06921 Sophia-Antipolis Cedex; France.*

Ericsson, On Scheduling Assignments and Receiver Behaviour, 3GPP TSG-RAN WG1 Meeting #76bis, Shenzhen, China, Mar. 31-Apr. 4, 2014, R1-141391.

Samsung, Mode 1 Resource Allocation for D2D Broadcast Communication, 3GPP TSG RAN WG1 Meeting #76bis, Shenzhen, P. R. China, Mar. 31-Apr. 4, 2014, R1-141307.

Qualcomm Incorporated, eNB Resource Allocation for D2D Broadcast Communication, 3GPP TSG-RAN WG1 #76BIS, Shenzhen, China, Mar. 31-Apr. 4, 2014, R1-141451.

* cited by examiner

SCHEMES RELATED TO RESOURCE ALLOCATION, DISCOVERY AND SIGNALING IN D2D SYSTEMS

CROSS-REFERENCE TO RELATED APPLICATION(S)

This application claims the benefit under 35 U.S.C. § 119(a) of a Korean patent application filed on May 9, 2014 in the Korean Intellectual Property Office and assigned Serial No. 10-2014-0055981, of a Korean patent application filed on Aug. 21, 2014 in the Korean Intellectual Property Office and assigned Serial No. 10-2014-0109236, of a Korean patent application filed on Sep. 25, 2014 in the Korean Intellectual Property Office and assigned Serial No. 10-2014-0128401, and of a Korean patent application filed on Nov. 6, 2014 in the Korean Intellectual Property Office and assigned Serial No. 10-2014-0153553, the entire disclosure of each of which is hereby incorporated by reference.

TECHNICAL FIELD

The present disclosure relates to resource allocation, discovery, and signaling schemes in device-to-device (D2D) networks. More particularly, the present disclosure relates to resource allocation, discovery, and signaling schemes in Long Term Evolution (LTE) network-based D2D systems.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the Long Term Evolution (LTE) system, an evolved Node B (eNB) dynamically allocates resources to a user equipment (UE) on a per-sub-frame basis. If semi-persistent scheduling (SPS) is activated, the UE is granted to periodically use resources allocated based on predetermined settings until the SPS is released.

FIG. 1 is a view illustrating an example of an LTE network-based device-to-device (D2D) system according to the related art.

Referring to FIG. 1, the LTE network-based D2D system may come in two communication modes. The two communication modes include in-coverage D2D communication mode and out-of-coverage D2D communication mode.

UEs 102, 104 and 106 are in-coverage mode UEs, and UEs 112 and 114 are out-of-coverage mode UEs. UEs 108 and 110 are partial in-coverage mode UEs.

In in-coverage mode, the resources used for the UE 102 to transmit data and control information are directly scheduled by an eNB 100. In out-of-coverage mode, the resources used for the UE 112 to transmit data and control information are selected by the UE 112 from a resource pool.

FIG. 2 is a view illustrating an example of a structure of a communication frame in a D2D communication system according to the related art.

Referring to FIG. 2, a D2D frame 200 may be divided into a scheduling assignment (SA) region 202 and a data region 204. The SA region 202 is a region where control information is transmitted and may contain multiple control units (resource units used for controlling). In each control unit of the SA region, the UE may transmit an SA indicating a resource to be used for transmission in the data region 204. The data region 204 typically has a length of tens of sub-frames or more. For example, the data region 204 may be 40 ms to 160 ms long.

The resource allocation scheme in LTE cannot be directly applied to D2D communication. Accordingly, a need exists for designing a resource allocation mechanism and signaling for LTE network-based D2D systems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a resource allocation scheme and a signaling scheme corresponding to the resource allocation scheme based on the characteristics of device-to-device (D2D) communication.

Another aspect of the present disclosure is to provide a flexible resource allocation method for device discovery in D2D systems to efficiently address problems with, e.g., half duplex and in-band emission.

In accordance with an aspect of the present disclosure, a method for performing D2D communication by an in-coverage user equipment (UE) in a cellular communication system is provided. The method includes receiving a scheduling grant through a downlink control channel from a base station evolved Node B (eNB) and transmitting a scheduling assignment (SA) message in an SA region of a D2D communication frame and data in a data region of the D2D communication frame, based on the scheduling grant, wherein the scheduling grant indicates a resource pattern for transmission (RPT) corresponding to a set of resource units or a subset of a resource unit in a time domain and a frequency domain that is used for transmission of the data.

In accordance with another aspect of the present disclosure, a method for performing D2D communication by an out-of-coverage UE in a cellular communication system is provided. The method includes monitoring an SA region and a data region of a D2D communication frame based on a preset resource pool, determining an unused SA unit and RPT respectively in the SA region and the data region, and transmitting an SA message and data respectively in the determined unused SA unit and RPT, wherein the SA message indicates the RPT corresponding to a set of resource units or a subset of a resource unit in a time domain and a frequency domain that is used for transmission of the data.

In accordance with another aspect of the present disclosure, an in-coverage UE performing D2D communication in a cellular communication system is provided. The in-coverage UE includes a transceiver configured to receive a scheduling grant through a downlink control channel from an eNB and to transmit an SA message in an SA region of a D2D communication frame and data in a data region of the D2D communication frame, based on the scheduling grant, wherein the scheduling grant indicates an RPT corresponding to a set of resource units or a subset of a resource unit in a time domain and a frequency domain that is used for transmission of the data.

In accordance with another aspect of the present disclosure, an out-of-coverage UE performing D2D communication in a cellular communication system is provided. The out-of-coverage UE includes a controller configured to monitor an SA region and a data region of a D2D communication frame based on a preset resource pool, and to determine an unused SA unit and RPT respectively in the SA region and the data region, and a transceiver configured to transmit an SA message and data respectively in the determined unused SA unit and RPT, wherein the SA message indicates a RPT corresponding to a set of resource units or a subset of a resource unit in a time domain and a frequency domain that is used for transmission of the data.

In accordance with another aspect of the present disclosure, a method for performing D2D discovery by a UE in a cellular communication system is provided. The method includes receiving, from an eNB, discovery resource pool information and at least one of linkage pattern information on a discovery resource unit (DRU) pair, information on a count of transmission of discovery messages in a unit discovery period, and information on a hopping interval of the DRU pair, obtaining information on a resource allocated for transmission of the discovery messages based on the received at least one information, and transmitting the discovery messages in M discovery periods based on at least one of a rule of DRU hopping and a rule of DRU pair hopping, wherein the DRU hopping is used in each of the M discovery periods, and the DRU pair hopping is used once in the M discovery periods.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view illustrating an example of a resource pattern design according to an embodiment of the present disclosure;

FIG. 13 is a view illustrating an example of a time domain RPT in case a transmission period=20 and repetition count=4 according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before detailing the present disclosure, some terms as used herein may be interpreted as follows, for example. However, it should be noted that the present disclosure is not limited thereto.

A base station (BS) is an entity communicating with a user equipment (UE) and may be denoted as BS, Node B (NB), evolved Node B (eNB), or Access Point (AP).

The user equipment is an entity communicating with a BS, and may be denoted as UE, mobile station (MS), mobile equipment (ME), device, or terminal.

The device-to-device (D2D) frame may be transmitted through uplink (UL) resources of Long Term Evolution (LTE) resources.

D2D communication in the LTE network aims to enable broadcast communication between UEs. The UE in D2D communication is not designated in resource allocation or not explicitly controlled. Transmission of control information and data between UEs is one-way transmission with no feedback for data broadcasting.

Figure 11:
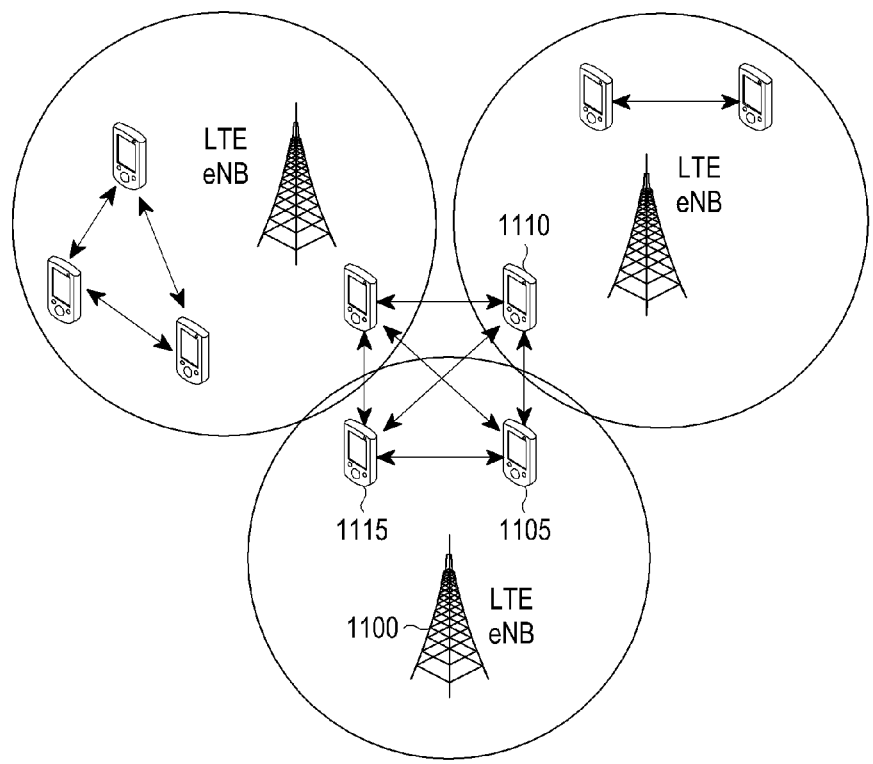
FIG. 11 is a view illustrating an example of a D2D system enabling discovery and communication between UEs according to an embodiment of the present disclosure.

FIG. 11 is a view illustrating an example of a D2D system enabling discovery and communication between UEs according to an embodiment of the present disclosure.

Referring to FIG. 11, a material characteristic of the D2D system is that neighbor UEs (i.e., D2D devices) 1105 may discover each other with the aid of an eNB 1100 or even without the aid of the eNB 1100.

As shown in FIG. 11, the UE 1105 may discover a UE 1115 in the same cell as well as a UE 1110 in a neighbor cell.

Figure 12:
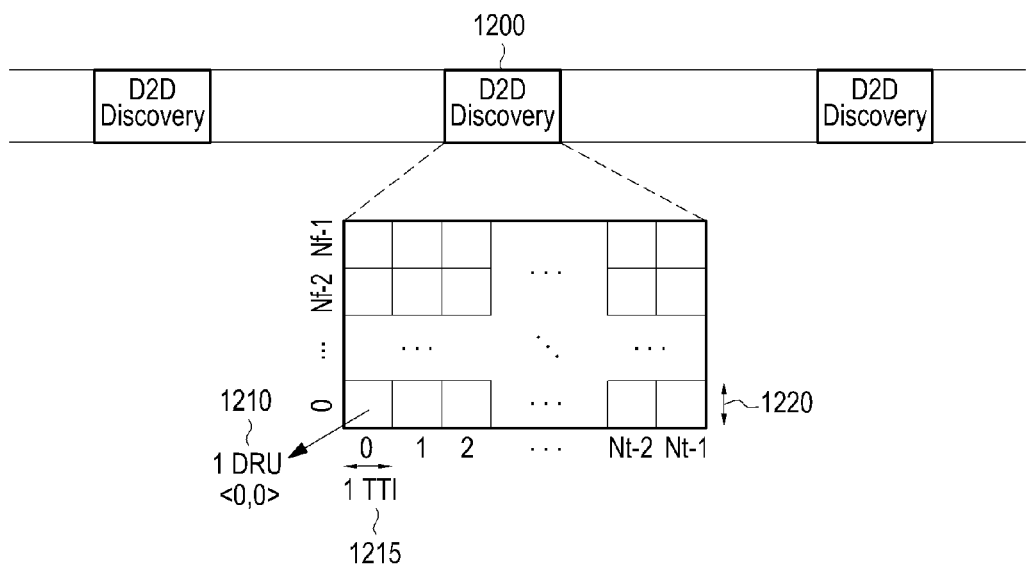
FIG. 12 is a view illustrating an example of a D2D discovery frame structure in a D2D system according to an embodiment of the present disclosure.

FIG. 12 is a view illustrating an example of a D2D discovery frame structure in a D2D system according to an embodiment of the present disclosure.

Referring to FIG. 12, a particular period 1200 with an arbitrary length in each cell may be periodically allocated for D2D discovery.

As shown in FIG. 12, one discovery period 1200 may include multiple discovery resource units (DRUs) 1210.

One DRU 1210 may take up one transmission time interval (TTI) 1215 (e.g., one sub-frame) in the time domain and one or more resource blocks 1220 in the frequency domain. One DRU 1210 is generally used in transmitting one UE discovery message, and accordingly, the size of one DRU may be influenced by the size of the discovery message. Referring to FIG. 12, each discovery period may have a total of (Nt*Nf) DRUs, and each DRU may be denoted in DRU <nt, nf>, where nt is a TTI index (or time index) and nf is a frequency index. The eNB may allocate DRUs used for a particular UE in each discovery period. Or, the UE may randomly select DRUs for transmitting a discovery message.

In this case, it should be noted that UEs performing transmission in the same time (TTI) cannot hear each other due to half-duplex limitation. Accordingly, an efficient discovery resource allocation and access mechanism is required for quick and efficient discovery between D2D UEs.

The overall procedure by an in-coverage UE is described with reference to FIGS. 1 and 2, as follows.

1) A D2D resource pool for transmission of control information and data of the D2D UE 102 may be scheduled by the eNB 100 through a broadcast channel (BCH).

2) The eNB 100 transmits a D2D_Grant (i.e., a scheduling grant) for a scheduling assignment (SA) and/or data to the D2D UE 102. The D2D UE 102 may transmit an SA in an SA resource allocated by the eNB 100 or transmit data in a data transmission resource allocated by the eNB 100.

3) The D2D UEs 104 and 106 read the SA in the SA region 202 and check if the target identifier (ID) matches the D2D UEs. If the target ID of the SA matches the D2D UEs 104 and 106, the D2D UEs 104 and 106 may implicitly or explicitly receive data from the resource linked to the SA.

The overall procedure by an out-of-coverage UE is described with reference to FIGS. 1 and 2, as follows.

1) A D2D resource pool for control information and data may be preset.

2) The D2D UE 112 selects an SA and/or data resource for transmission to another D2D UE 114 based on a monitoring SA (or data) resource pool. The D2D UE 112 may transmit an SA with an intended target ID in the selected SA resource or transmit data in the selected data resource.

3) The other D2D UE 114 checks the SA in the SA region 202 for whether there is a target ID matching the D2D UE. If the target ID of the SA matches the other D2D UE 114, the other D2D UE 114 may implicitly or explicitly receive data from the resource linked to the SA.

The overall procedure by a partial in-coverage UE in case an SA is not scrambled with a target ID is described with reference to FIGS. 1 and 2, as follows. The scrambling may be, e.g., that an SA is cyclic redundancy check (CRC)-masked with the target ID. Selectively, data as well as the SA may be scrambled and transferred.

1) A D2D resource pool for transmission of control information and data of the first D2D UE 108 may be scheduled by the eNB 100 through a BCH.

2) The eNB 100 transmits a D2D_Grant for an SA and/or data to the first D2D UE 108. The first D2D UE 108 may transmit an SA with an intended target ID in an SA resource allocated by the eNB 100 or transmit data in a data transmission resource allocated by the eNB 100.

3) The second D2D UE 110 decodes the SA signal from the first D2D UE 108 and selects an unused SA and data resource for a next SA period. The second D2D UE 110 may transmit an SA with an intended target ID in the selected SA resource or transmit data in the selected data resource.

4) Another neighbor D2D UE checks if the target ID of the SA matches the D2D UE, and if the SA matches the D2D UE, may implicitly or explicitly receive data in the resource linked to the SA.

The overall procedure by a partial in-coverage UE in case an SA is scrambled with a target ID is described with reference to FIGS. 1 and 2, as follows.

1) A D2D resource pool for transmission of control information and data of the first D2D UE 108 may be scheduled by the eNB 100 through a BCH.

2) The eNB 100 transmits a D2D_Grant for an SA and/or data to the first D2D UE 108. The first D2D UE 108 may transmit an SA with an intended target ID in an SA resource allocated by the eNB 100 or transmit data in a data transmission resource allocated by the eNB 100.

3) Since the SA is scrambled with the target ID, the second D2D UE 110 cannot decode the SA and merely senses a signal from the first D2D UE 108 to select an unused SA and data resource for a next SA period. The second D2D UE 110 may transmit an SA with an intended target ID in the selected SA resource or transmit data in the selected data resource.

4) Another neighbor D2D UE checks if the target ID of the SA matches the D2D UE, and if the SA matches the D2D UE, may implicitly receive data in the resource linked to the SA.

The overall procedure by a partial in-coverage UE in case an SA is scrambled or not scrambled with a target ID is described with reference to FIGS. 1 and 2, as follows.

1) A D2D resource pool for transmission of control information and data of the first D2D UE 108 may be scheduled by the eNB 100 through a BCH.

2) The eNB 100 transmits a D2D_Grant for an SA and/or data to the first D2D UE 108. The first D2D UE 108 may transmit an SA with an intended target ID in an SA resource allocated by the eNB 100 or transmit data in a data transmission resource allocated by the eNB 100.

3) In case the received SA is scrambled with the target ID, the second D2D UE 110 cannot decode the SA from the first D2D UE 108 and merely senses a signal from the first D2D UE 108 to select an unused SA and data resource for a next SA period. The second D2D UE 110 may transmit an SA with an intended target ID in the selected SA resource or transmit data in the selected data resource. In case the received SA is not scrambled, the second D2D UE 110 may decode the SA signal from the first D2D UE 108 and selects an unused SA and data resource for a next SA period. The second D2D UE 110 may transmit an SA with an intended target ID in the selected SA resource or transmit data in the selected data resource.

4) Another neighbor D2D UE checks if the target ID of the SA matches the D2D UE, and if the SA matches the D2D UE, may implicitly or explicitly receive data in the resource linked to the SA.

For the scrambled SA, the linkage between the SA and data may be implicit. In order to enable explicit linkage between the SA and data for the scrambled SA, the D2D UE may have an SA-data linkage table for scrambled SA reception. Based on the SA-data linkage table for scrambled SA reception, the D2D UE may be aware of data resources even without decoding the SA when sensing the SA and the location of the SA resource. Selectively, the SA signal may include one-bit information to indicate whether to be a scrambled SA or not. The D2D UE may be aware of the implicit or explicit mapping policy using the one-bit information and exactly discover unused data resources.

Further, depending on the scheme in which resources are allocated, the UE may operate in two modes (i.e., mode 1 or mode 2). In mode 1, the eNB schedules corresponding resources for data transmission in the UE. In mode 2, each UE selects resources in a resource pool for data transmission. Accordingly, the in-coverage UE may operate in the two modes both. That is, the in-coverage UE, if allocated resources by the eNB, may operate in mode 1, or if selecting resources on its own, operate in mode 2. The out-of-coverage UE cannot communicate with the eNB, and thus, the out-of-coverage UE may operate only in mode 2. The out-of-coverage UE itself may select resources from a preset resource pool for data transmission.

Figure 1:
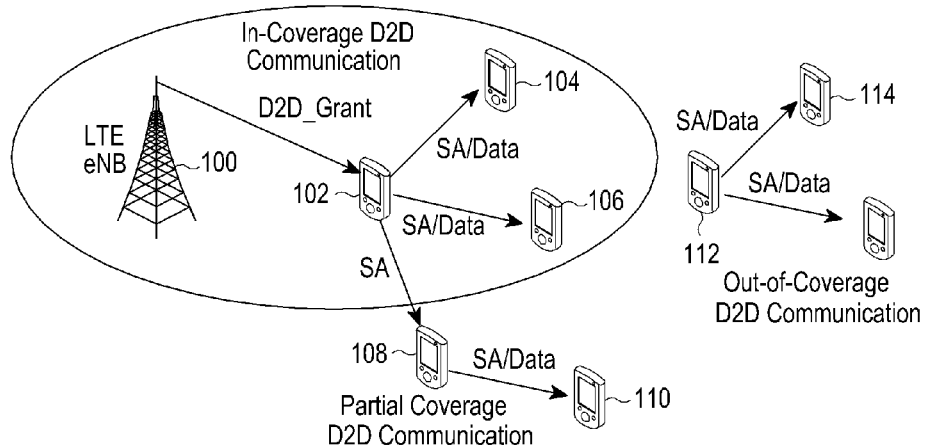
FIG. 1 is a view illustrating an example of a Long Term Evolution (LTE) network-based device-to-device (D2D) system according to the related art.
Figure 2:
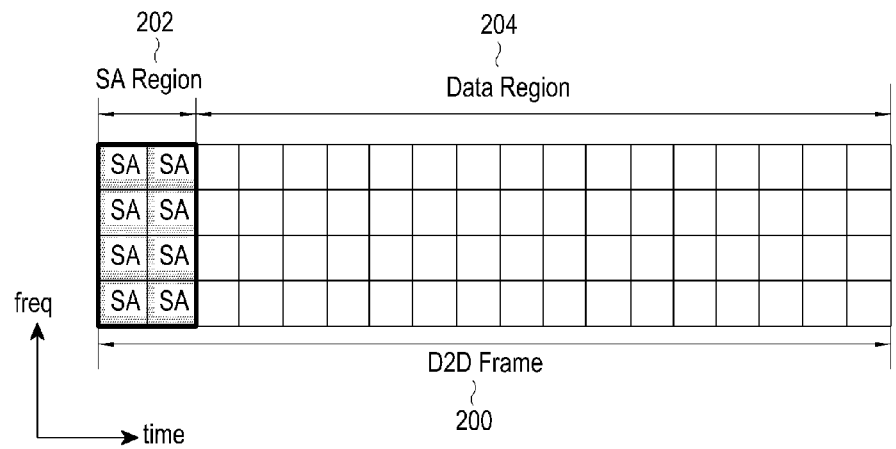
FIG. 2 is a view illustrating an example of a structure of a communication frame in a D2D communication system according to the related art.

Referring to FIG. 1, the UEs 102, 104, and 106 may operate in mode 1 or mode 2, but the UEs 112, 114, 108, and 110 may operate only in mode 2.

Figure 3:
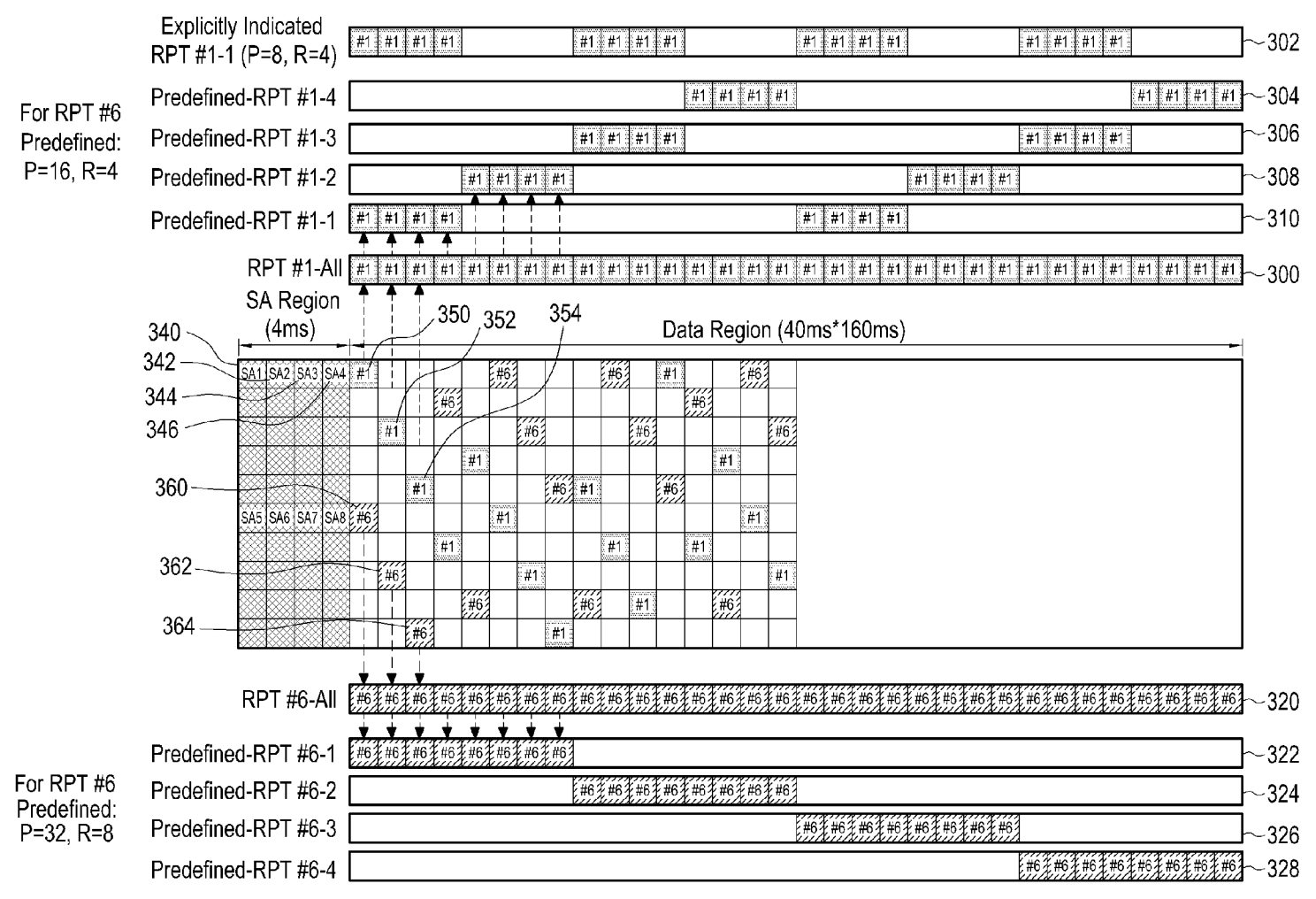

FIG. 3 is a view illustrating an example of a resource pattern design according to an embodiment of the present disclosure.

Referring to FIG. 3, a method for designing a resource pattern according to the present disclosure is described.

One RPT may include a set (collection) of resource units in the time domain and frequency domain. One RPT may correspond to one resource set. The resource set may have consecutive resource units in the time domain, and the resource units on different time units may have different frequency positions from each other.

One RPT may correspond only to a subset of the resource set. For example, the subset may be a set of periodic resource units in the time domain or a set of consecutive resource units in multiple time units.

The RPT design may include various patterns supporting different types of traffic, such as voice traffic, burst traffic, file transfer protocol (FTP) traffic, or video streams.

One resource set starts from one resource unit of a first time unit. Resource units in subsequent time units may be derived (determined) by a particular rule. For example, the particular rule may be a predetermined frequency hopping pattern. A subset of one resource set may be derived by a time hopping rule. In the LTE system, one resource unit may be a resource block (RB) or an RB pair. The RB may correspond to a time unit that is one time slot, and the RB pair may correspond to a time unit of one sub-frame.

The relationships between the resource set, resource subset, and resource patterns are shown in FIG. 3.

Two resource sets, respectively, may start from a resource unit 350 with index #1 and a resource unit 360 with index #6 in the first time unit, and resource units 352, 362, 354, and 364 in a subsequent time unit may be determined based on a predetermined frequency hopping pattern. Each resource set may be divided into four resource subsets based on a predetermined time hopping rule. For example, the subsets 304, 306, 308, and 310 of resource set #1 300 may be designed by a time hopping rule '(period=16, repetition=4)' for periodic resource use. Here, the time hopping rule, '(period=16 and repetition=4),' means that time hopping is performed so that one subset has four consecutive sub-frames for the overall period of 16 sub-frames. Meanwhile, the subsets 322, 324, 326, and 328 of resource set #6 320 may be designed with a time hopping rule '(period=32, repetition=8)' for consecutive resource use.

Further, resource units to be used may be explicitly indicated to generate a new RPT.

Referring to FIG. 3, the new RPT 302 explicitly indicated for subset 1 of resource set 1 may be represented as a timing hopping rule '(set index=1, subset index=1, period 8, repetition=4).' Various resource patterns may be explicitly indicated using such preset parameters.

Similarly, in the D2D system, one resource unit may be one RB, one RB pair, or multiple RB pairs. Accordingly, the information of resource set may be jointly determined by the size of resource unit, frequency index of resource unit, and frequency hopping rule. For time domain RPTs in one resource set, each RPT may be represented with a transmission period, repetition count, and subset index.

Figure 13:
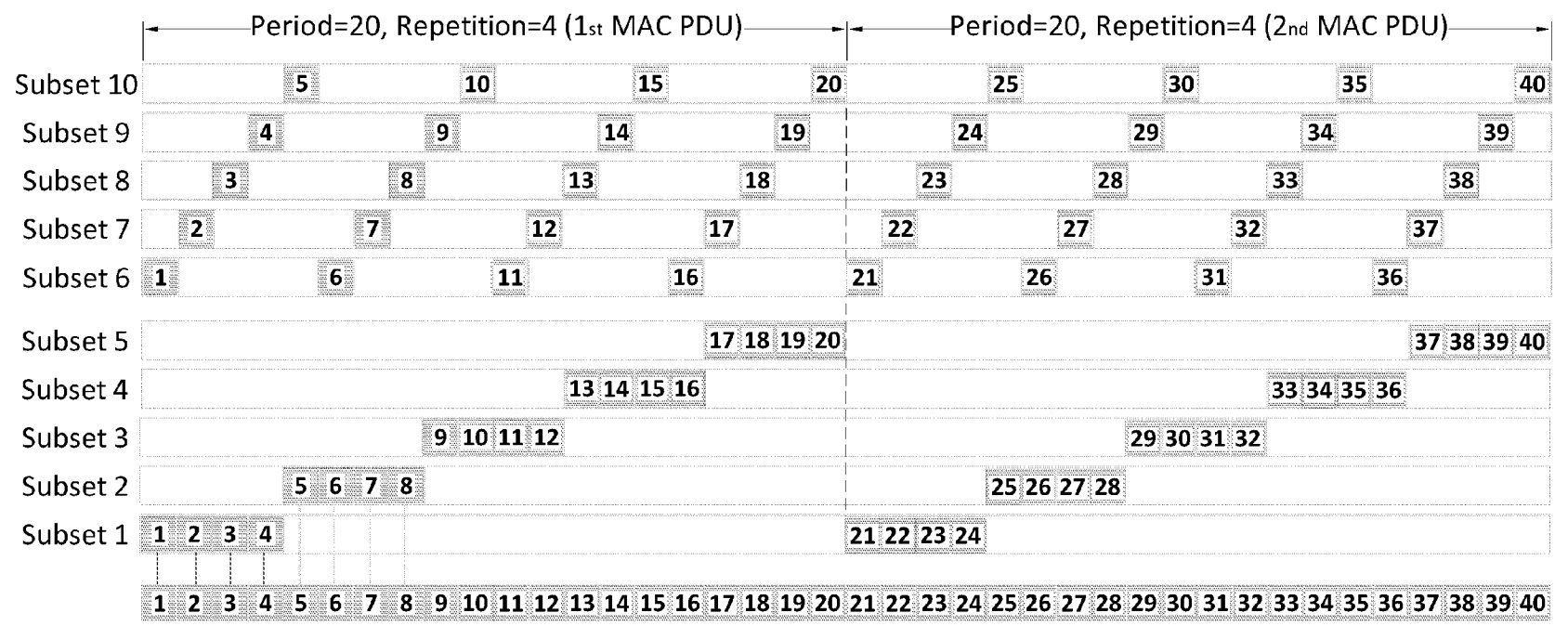

FIG. 13 is a view illustrating an example of a time domain RPT in case a transmission period=20 and repetition count=4 according to an embodiment of the present disclosure.

Referring to FIG. 13, the transmission period defines an interval between transmissions for multiple medium access control (MAC) protocol data unit (PDUs), the repetition count is the number of times that transmission is performed per MAC PDU, and each transmission per MAC PDU may be a repeated or duplicate version of the initial transmission. The subset index is a predefined index to indicate resources to be used.

Subsequently, a resource allocation signaling method according to the present disclosure is described.

The resource allocation signaling method may include 1) implicit signaling, 2) explicit signaling, and 3) semi-explicit signaling.

First, implicit signaling is described.

In the implicit signaling method, each SA may be directly linked to one or more resource patterns. The rule of linkage may be predetermined or preset by the network.

A possible linkage rule is that each SA is linked to a predetermined RPT (i.e., resource subset). If there are LxK SAs (in case the SA region is present over L time units and K frequency units), the SA with time unit 1 and frequency index k, SA(l,k), may be linked to the lth subset of the kth resource set (i.e., predetermined RPT #k-l).

For example, as shown in FIG. 3, SA1 340 is linked to a predetermined RPT #1-1 (subset 1 of resource set 1), and SA2 342 is linked to a predetermined RPT #1-2 (subset 2 of resource set 1). In this way, the number (L) of time slots of the SA region may be the same as the number of subsets of one resource set (i.e., the number of resource patterns of one resource set). There are overall LxK resource patterns, and each resource pattern is linked to an SA. When the eNB signals a scheduling grant to the UE, only indicating the index of the SA is required, and the resource pattern may be implicitly linked to the UE. The index of the SA may be indicated based on a predetermined indexing rule. For example, the indexing rule is to number SA indexes in order or to combine frequency indexes and time indexes.

Second, explicit signaling is described.

In the explicit signaling method, resources to be used are explicitly indicated, and resources for SAs and data may be distinctly indicated. In this case, there is no linkage between the SA and RPT. For example, as shown in FIG. 3, SA1 340 may be indicated for SA transmission, and predefined RPT #6-1 may be indicated for data transmission. For more flexible resource usage, a new RPT to be used may be explicitly indicated instead of indicating predefined resource patterns by the eNB. As described above, the eNB may explicitly indicate a new RPT with other parameters, such as, e.g., '(RPT #6-1: Set Index=6, Subset Index=1, Period=20, Repetition=4).'

Third, semi-explicit signaling is described.

In the semi-explicit signaling method, a limited number of SAs may be linked to a limited number of resource patterns. One possible method is to, in case predetermined RPTs are used, limit SA (1,k) with time unit 1 in frequency index k to be used only for RPTs (e.g., RPT #k-n (n∈[1:L])) in resource set k. For example, as shown in FIG. 3, SA1 340, SA2 342, SA3 344, and SA4 346 are limited to be used only for the RPTs of the first resource set. After obtaining an SA grant (i.e., scheduling grant), the UE may be aware of available RPTs. Additional information regarding exact resource usage may be indicated in the data grant. Since the index of the set may be implicitly indicated by the SA, (if a predetermined RPT is used), the SA grant only needs to indicate the subset index (e.g., Subset Index=2). Or, the data grant may explicitly indicate an RPT with a new parameter (e.g., Subset Index=2) having a new time hopping rule '(Period=20, Repetition=6).' The semi-explicitly signaling method may achieve more flexible resource indication than explicitly signaling by using the same number of bits, and this is why it is needed to indicate resource usage from a limited number of resource patterns rather than all the resource patterns.

Figure 4:
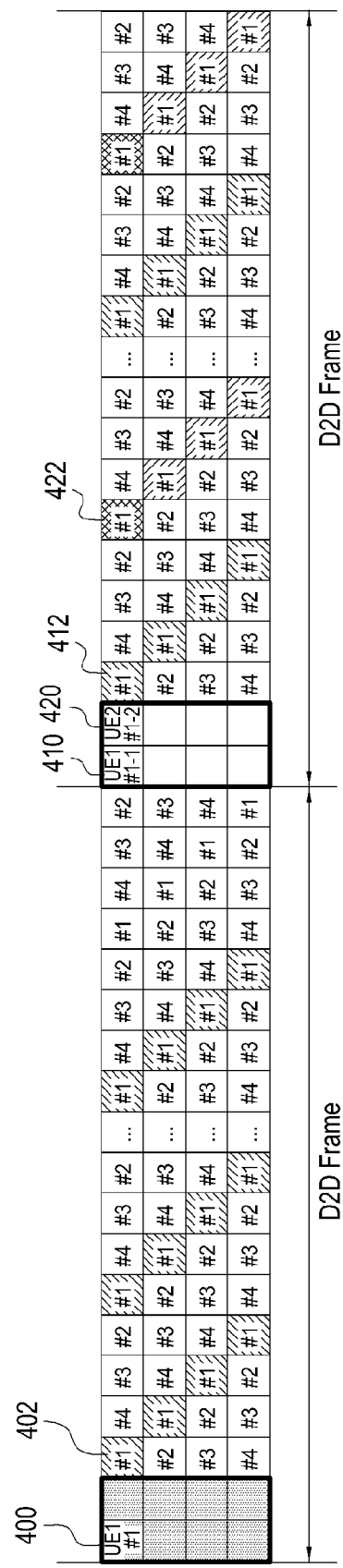
FIG. 4 is a view illustrating an example of semi-explicit signaling resource allocation according to an embodiment of the present disclosure.

FIG. 4 is a view illustrating an example of semi-explicit signaling resource allocation according to an embodiment of the present disclosure.

Referring to FIG. 4, an example of semi-explicitly signaling is shown.

Two SAs 410 and 420 in the upper end of the SA region are linked to a resource set #1 (412, 422). In the first D2D frame, one SA 400 corresponding to the resource set 402 is granted. In the second D2D frame, two SAs 410 and 420 are granted, and respectively corresponds to a resource subset #1-1 (412) and resource subset #1-2 (422).

Another possible semi-explicitly signaling method is to limit SA(1,k) in time unit 1 and frequency index k to be used only for RPTs (i.e., predetermined RPT #m-1 (m∈[1:K])) corresponding to subset 1 of each resource set.

The above-described signaling method is to explicitly or implicitly indicate the RPT subset index for data transmission in the time domain, together with a period value and a repetition value. Alternatively, a bitmap-based method may be used to explicitly indicate a resource subset to be used. Generally, a bitmap (N,k) has a length of N bits, and among the N bits, k bits are 1's, and the remainder are 0's. The bitmap (N,k) means that among the N sub-frames, k sub-frames indicated (indicated with bits that are 1's) are used for data transmission. For example, the bitmap, '11110000,' (N=8, k=4) means that the first four sub-frames (sub-frames 0, 1, 2, and 3 indicated by 1's in the bitmap) are used. For example, if the bitmap is repeated twice, like '11110000 11110000,' sub-frames 0, 1, 2, and 3 and sub-frames 8, 9, 10, and 11 will be used. Accordingly, a combination of a basis bitmap (RPT_Bitmap ID) and a bitmap repetition count (RPT_Bitmap_Repetition_Num) may be used to indicate the RPT in the time domain. By indicating the bitmap repetition count, the transmitter and receiver may obtain the number of sub-frames granted for data transmission, thus allowing for efficient resource usage.

A frequency hopping method according to the present disclosure is described.

Generally, the frequency hopping method (both Types 1 and 2) used in the LTE system may be recycled for D2D communication. A one-bit hopping flag may be used to indicate whether frequency hopping is used or not. According to bandwidths, similarly to the N_UL_hop parameter in the LTE system, one bit or two bits may be used to indicate specific hopping types and parameters. For mode 1 communication of D2D system, most of the parameters used in the LTE system may be recycled. For mode 2 communication of D2D system, some of the hopping rules and some of the parameters used in the LTE system need to be modified.

It may be assumed that frequency resources in the D2D resource pool have $N_{RB}^{D2D}$ contiguous resource blocks. The type 2 predetermined hopping pattern is first described.

The frequency hopping pattern used in transmission of time slot $n_s$ in the data region of the D2D frame may be given by the scheduling grant with a predetermined pattern according to the following Equation. Here, slot number $n_s$ is defined as a slot number consecutively re-indexed in the D2D resource pool. Similar to the current LTE system, the slot number may be obtained from the modulo-20 operation.

$$\tilde{n}_{PRB}^{D2D}(n_s) = (\tilde{n}_{VRB}^{D2D} + f_{hop}(i) \cdot N_{RB}^{D2D,sb} + \qquad \text{Equation 1}$$
$$((N_{RB}^{D2D,sb} - 1) - 2(\tilde{n}_{VRB}^{D2D} \bmod N_{RB}^{D2D,sb})) \cdot f_m(i))$$
$$\bmod(N_{RB}^{D2D,sb} \cdot N_{sb}^{D2D})$$

$$i = \begin{cases} \lfloor n_s/2 \rfloor & \text{inter-subframe hopping} \\ n_s & \text{intra and inter-subframe hopping} \end{cases} \qquad \text{Equation 2}$$

Here, $\tilde{n}_{VRB}^{D2D}$ is an index of an RB allocated in the D2D Physical uplink shared channel (D2D PUSCH), and may be obtained from the scheduling grant and D2D bandwidth parameters. The size of each subband, $N_{RB}^{D2D,sb}$, may be given in the following Equation.

$$N_{RB}^{D2D,sb} = \begin{cases} N_{RB}^{D2D} & N_{sb}^{D2D} = 1 \\ \lfloor N_{RB}^{D2D}/N_{sb}^{D2D} \rfloor & N_{sb}^{D2D} > 1 \end{cases} \qquad \text{Equation 3}$$

Here, the number of subbands, $N_{sb}^{D2D}$, may be given by higher layer signaling, and the D2D bandwidth, $N_{sb}^{D2D}$, may be obtained from system information. $N_{sb}^{D2d}$ may be 1, 2, or 4 (i.e., {1, 2, 4}). The parameter, 'D2D-Hopping-mode,' provided by higher layer signaling determines whether the hopping is inter-subframe hopping or intra/inter-subframe hopping. In each time slot, the function, $f_{hop}(i)$, determines a hopping number, and the function, $f_m(i)$, determines whether mirroring is used or not. The functions may be given as follows.

$$f_{hop}(i) = \begin{cases} 0 & N_{sb}^{D2D} = 1 \\ \left(f_{hop}(i-1) + \sum_{k=i \cdot 10+1}^{i \cdot 10+9} c(k) \times 2^{k-(i \cdot 10+1)}\right) \bmod N_{sb}^{D2D} & N_{sb}^{D2D} = 2 \\ \left(f_{hop}(i-1) + \left(\sum_{k=i \cdot 10+1}^{i \cdot 10+9} c(k) \times 2^{k-(i \cdot 10+1)}\right) \bmod (N_{sb}^{D2D} - 1) + 1\right) \bmod N_{sb}^{D2D} & N_{sb}^{D2D} > 2 \end{cases} \qquad \text{Equation 4}$$

$$f_m(i) = \begin{cases} i \bmod 2 & N_{sb}^{D2D} = 1 \text{ and intra/inter-subframe hopping} \\ \text{CURRENT\_TX\_NB} \bmod 2 & N_{sb}^{D2D} = 1 \text{ and inter-subframe hopping} \\ c(i \cdot 10) & N_{sb}^{D2D} > 1 \end{cases} \qquad \text{Equation 5}$$

Here, $f_{hop}(-1)=0$ and the pseudo-random sequence, c(i), may be determined in 3rd Generation Partnership Project (3GPP) Technical Specification (TS) 36.211, Ch. 7.2. 'CURRENT_TX_NB' indicates the transmission number of the transmission block transmitted in time slot $n_s$. However, in order to make 'CURRENT_TX_NB' specific to D2D and common to all the UEs using the same D2D resource pool, 'CURRENT_TX_NB' may be set to a sub-frame index in the D2D resource pool. The generator of the random sequence may be initialized by $c_{init}=N_{ID}^{cell}$.

For out-of-coverage communication, the parameter provided by a higher layer may be preset for a frequency hopping pattern. For example, $N_{ID}^{cell}$ may be a fixed value or may be preset for out-of-coverage communication (for example, $N_{ID}^{cell}$ may be fixed to '510') because the UEs in the out-of-coverage communication are not located in any cell. Even in the in-coverage scenario, some parameters may be preset to simplify the hopping pattern. For example, the parameters may be preset to always use inter-subframe hopping.

The type 1 hopping pattern may be described in the following way.

For ease of description, it may be assumed that only inter-subframe hopping is used. That is, it may be assumed that intra-subframe hopping is not used. For the given RB index $n^{PRB}$, the RB index allocated to sub-frame i may be obtained as follows.

$$n_{PRB}(i)=(n_{PRB}+i\times\lfloor N_{RB}^{D2D}\times a\rfloor)\bmod N_{RB}^{D2D} \qquad \text{Equation 6}$$

Here, a=1/2, 1/4, or −1/4, and may be indicated by N_UL_hop. Similarly, in the out-of-coverage case, parameter a may be fixed or selected from a preset set.

When the frequency resources in the D2D resource pool are not contiguous, hopping rules for type 1 and type 2 may differ a little bit.

For example, there are two different contiguous RB groups, among which one RB group has a length of $N_{RB,L1}^{D2D}$, and the other RB group has a length of $N_{RB,L2}^{D2D}$. If the single carrier characteristics are guaranteed by making settings such as $N_{RB}^{D2D}=N_{RB,L1}^{D2D}+N_{RB,L2}^{D2D}$, i.e., if the RBs are not separated into different RB groups, the type 1 and type 2 hopping may be immediately used. Otherwise, hopping exists in each group. That is, $N_{RB}^{D2D}=N_{RB,L1}^{D2D}$ is set in one RB group, and $N_{RB}^{D2D}=N_{RB,L2}^{D2D}$ in the other RB group.

A method for designing a scheduling grant and scheduling allocation according to the present disclosure is described.

In LTE, an uplink scheduling grant of downlink control information (DCI) format 0 may be recycled in a D2D scheduling grant. The D2D scheduling grant may be differentiated by performing CRC masking with a UE-specific D2D Radio Network Temporary Identifier (RNTI). Further, the settings of semi-explicitly scheduling may be recycled for supporting semi-persistent D2D data transmission. In the case of semi-persistent scheduling, the UE-specific D2D SPS RNTI may be used for CRC masking.

Table 1 describes an example of the DCI format 0 field for a D2D grant.

TABLE 1

| Field Name | Length | Use in D2D-Grant (D2D RNTI/D2D SPS RNTI) |
|---|---|---|
| Flag for format0/format1A differentiation | 1 | Merge Both (Assuming Hopping Always Enabled) 00: SA Only |
| Hopping flag | 1 | 01: Data Only 10: SA-Data linked (Implicit, with Predefined Rule 1) 11: SA-Data linked (Implicit, with Predefined Rule 2) |
| N_Ulhop | 1 (1.4 MHz) 1 (3 MHz) 1 (5 MHz) 2 (10 MHz) 2 (15 MHz) 2 (20 MHz) | Hopping Type and Pattern * For SA Only case above, this field can be used to indicate Explicit or Semi-Explicit signaling |
| Resource block assignment | 5 (1.4 MHz) 7 (3 MHz) 7 (5 MHz) 11 (10 MHz) 12 (15 MHz) 13 (20 MHz) | PRB Allocation for SA and/or Data RPT Index (=Set Index + Subset Index) 3 + 2 (1.4 MHz), 4 + 3 (3 MHz), 5 + 2 (5 MHz) 6 + 5 (10 MHz), 7 + 5 (15 MHz), 7 + 6 (20 MHz) |
| ~~(MCS) and ~~(RV) | 5 | May implicitly indicate the number of repetitions per TB * For SA Only case above, this field can be used to indicate SA repetitions if supported |
| New Data Indicator (NDI) | 1 | Reserved |
| Channel Quality Indicator (CQI) request | 1 | Reserved |
| Transmit Power Control (TPC) for Physical Uplink Shared Channel (PUSCH) | 2 | |
| Cyclic shift for ~~(DM RS) | 3 | |

TABLE 1-continued

| Field Name | Length | Use in D2D-Grant (D2D RNTI/D2D SPS RNTI) |
|---|---|---|
| UL index (~~(TDD) only) | 2 | Reserved |
| Downlink Assignment Index | 2 | Reserved |

Upon using explicit signaling only, the SA and data resource allocation are signaled in a single grant.

An example of the DCI format 0 field for D2D grant in case only explicit signaling is used is shown in Table 2.

TABLE 2

| Field Name | Length | Use in D2D-Grant (D2D RNTI/D2D SPS RNTI) |
|---|---|---|
| Hopping flag | 1 | PUSCH Hopping flag |
| SA Resource block assignment | 6 | SA Index |
| Data Resource block assignment | 5~13 | Data RB Index BW dependent (N_UL_hop included) |
| Data Time Domain RPT (T-RPT) Index | 7 | Time domain RPT index (May use explicit subset index indication or bitmap index indication) |
| Data T-RPT Length (or Number of RPT Bitmap Repetitions) | 4 | T-RPT length for data transmissions (or number of RPT bitmap repetitions if RPT bitmap is used) |
| TPC for PUSCH | 1 | Power control indication |
| MCS and RV NDI CQI request Cyclic shift for DM RS UL index (TDD only) Downlink Assignment Index | | May not be used or optionally used due to the size limit of DCI format 0 |

In this case, because some of the fields of DCI format 0, by nature, might not be used and due to size limitation, some of the fields may use only a limited number of bits.

If the bit length of some fields is not enough to indicate a desired range, higher layer signaling (e.g., radio resource control (RRC) signaling) may be used together in order to achieve indication of the desired range.

For example, the 'SA resource block assignment' field in Table 2 may have six bits and may indicate only 64 values. If the number of SA indexes is smaller than 64, mapping of the SA indexes may be fixed to an explicit indication scheme. If the number of SA indexes is larger than 64, a problem arises in indicating all the SA indexes used. In this case, additional bits from the higher layer may be used to expand the index indication. For example, one additional bit may be signaled from the higher layer, and the additional bit may be treated as most significant bit (MSB). Accordingly, a total of seven bits (one MSB+six bits) may be used to indicate 128 values. If more bits are higher layer signaled, the values indicated may be further expanded. Such approach may be treated as a method for signaling an SA index offset value from the higher layer. The exact SA index is to be calculated by adding the SA index offset to the six-bit index value.

Alternatively, the six bits may indicate only the frequency domain index of the SA, and the time domain index may be signaled from the higher layer to the UE. Or, the SA time domain index may be derived from the UE time when the UE receives the DCI. For example, the SA time domain index may be calculated by adding a preset offset to the UE time when the UE receives the DCI. An exact SA index may be obtained by combining the SA time domain index and the frequency domain index.

In case the higher layer signaling is unavailable, the number of SAs belonging to the SA pool should be guaranteed to be less than 64. The maximum number of the SAs in the frequency domain should be considered to set the size of the SA pool in the time domain. Assuming that the number of SAs in the frequency domain, the number of sub-frames in an SA in the time domain should be not more than 64/SA_Nf.

In case an SA pool common to mode 1 and mode 2 is used, a setting may be made so that the first 64 SAs may be used for mode 1, and the other SAs may be used for mode 2. By doing so, SA usage in mode 1 and mode 2 may be implicitly distinguished (or differentiated).

Now described is another example of a possible indication method using the repetition count ('RPT_Bitmap_Repetition_Num' field) of the RPT bitmap.

Option 1 is an explicit indication method. As described above in connection with Table 2, if it is possible to include the repetition count parameter ('RPT_Bitmap_Repetition_Num' field) of RPT bitmap in the DCI, explicitly indicating the parameter is the most straightforward method. Otherwise, the repetition count of RPT bitmap may be indicated by higher layer signaling as well.

Option 2 is an implicit indication method. The repetition count of RPT bitmap may be implicitly indicated as well. If a data pool size is given, the RPT bitmap may be repeated to the end of the data pool. That is, the RPT bitmap may be spanned to reach the overall data pool in the time domain. Unless the data pool size is given (for example, if only a start time is given), the RPT bitmap may be repeated until the start time of a next SA pool arrives. For example, when a mode 1 SA pool and a mode 2 SA pool are multiplexed in the frequency domain, (if there is no collision with the mode 2 data pool), the mode 1 data RPT bitmap may be repeated to a next mode 1 SA pool. Otherwise (i.e., if there might be a collision with the mode 2 data pool), the mode 1 data RPT bitmap may be repeated to the mode 2 data pool to avoid collision. When the mode 1 SA pool and the mode 2 SA pool are multiplexed in the time domain, the mode 1 data RPT bitmap may be repeated to a next mode 2 SA pool.

Alternatively, a data transmission count (or number of MAC PDUs to be transmitted) may be preset. It may be assumed that four times of transmission is used for one MAC PDU, and RPT bitmap (N, k) uses (N=8,k=1), (N=8, k=2), (N=8,k=4), or (N=8,k=8). If two MAC PDUs are preset, eight times of transmission is required. The RPT bitmaps (N=8,k=1), (N=8,k=2), (N=8,k=4) and (N=8,k=8), respectively, may be repeated eight times, four times, twice, and once for eight transmissions (two MAC PDUs). When a setting is previously made to transmit at least one MAC PDU, the RPT bitmaps (N=8,k=1), (N=8,k=2), and (N=8, k=4), respectively, may be repeated four times, twice, and once for four transmissions (one MAC PDU). The RPT bitmap (N=8,k=8) may be repeated once for eight transmissions (two MAC PDUs). Such approach is appropriate particularly for mode 1 transmission.

Similarly, the SA needs to indicate resource usage for the target UE receiver. Examples of SA fields are shown in Table 3.

TABLE 3

| SA Field Name | Length | Usage |
|---|---|---|
| ID | N | RX (Group) ID and/or TX ID |
| Flag for SA-RPT linkage indication | 2 | Explicit/Semi-Explicit/Implicit with Predefined Rule 1/Implicit with Predefined Rule 2 |
| MCS and RV | 5 | Common for all TBs, and implicitly indicate the number of repetitions per TB |
| Cyclic shift for DM RS | 3 | For in-coverage UE, same as indicated in D2D-grant For out-of-coverage UE, following predefine rule |
| Hopping Pattern | 1 (1.4 MHz) 1 (3 MHz) 1 (5 MHz) 2 (10 MHz) 2 (15 MHz) 2 (20 MHz) | For in-coverage UE, same as indicated in D2D-grant For out-of-coverage UE, following predefine rule |
| Resource block assignment | 5 (1.4 MHz) 7 (3 MHz) 7 (5 MHz) 11 (10 MHz) 12 (15 MHz) 13 (20 MHz) | For in-coverage UE, same as indicated in D2D-grant For out-of-coverage UE, following predefine rule |
| Flag for SPS Indication | 1 | SPS or not |
| TX Timing Information | 6 | Transmit timing information If UL timing is used, timing advance (TA) value is indicated |
| Mode Indication | 1 | Indicate Mode 1 or Mode 2 to receivers |
| Power Information | M1 | Power information is power control supported |
| Others | M2 | Reserved |

In the in-coverage case, the information in the D2D grant should be delivered in SA contents. In the D2D SPS grant, a flag for indicating SPS-based resource usage, "Flag for SPS Indication," may be used. It may be assumed that if the SPS flag is enabled, the resource is endlessly and repeatedly (or persistently) used until the resource is released.

In the out-of-coverage case, the SPS indication indicates that the resource is to be used at least in the next transmission interval, and is thus useful as well. Accordingly, other UEs desiring data transmission may be aware that the resource is used, and in order to avoid collision, might not select the resource.

In case the UE, which is in communication mode 1, may transmit data along with a UL timing (i.e., timing advance (TA)), it needs to indicate a TA value allowing other UEs to receive data at proper timings. Further, when the SA pool is jointly used in mode 1 and mode 2, it is necessary and useful to indicate the mode to the UE receiver (the "Mode Indication" field in Table 3). This is why data pools of mode 1 and mode 2 differ from each other, and usage of parameters (such as, e.g., hopping parameters for data resource allocation) may be different as well. Such explicit mode indication enables the UE to identify the communication mode that allows the receiver to perform a proper operation. Alternatively, a particular TA value may be used to identify mode 1 or mode 2. For example, as the TA value, 0 may be used to indicate the mode 2 case. The reason for this is that mode 1 UEs usually have a valid TA value (a value other than 0) and mode 2 UEs not.

Given DCI format 0 of Table 2, corresponding SA contents are described in connection with Table 4.

TABLE 4

| SA Field Name | Length | Usage |
|---|---|---|
| ID | N | RX (Group) ID and/or TX ID |
| Data Resource block assignment | 5~13 | Data RB Index BW dependent (N_UL_hop included) |
| Data T-RPT Index | 7 | For in-coverage UE, same as indicated in D2D-grant For out-of-coverage UE, following predefined rule |
| Data T-RPT Length (or Number of RPT Bitmap Repetitions) | 4 | T-RPT length for data transmissions (or number of RPT bitmap repetitions if RPT bitmap is used) |
| MCS and RV | 5 | Common for all TBs (RV may be pre-fixed) |
| Flag for SPS Indication | 1 | SPS or not |
| TX Timing Information | 6 | Transmit timing information If UL timing is used, timing advance (TA) value is indicated |
| Mode Indication | 1 | Indicate Mode 1 or Mode 2 to receivers |
| Others | M | Reserved |

Similarly, some parameters, e.g., RPT bitmap repetition count, may be implicitly indicated.

Figure 5:
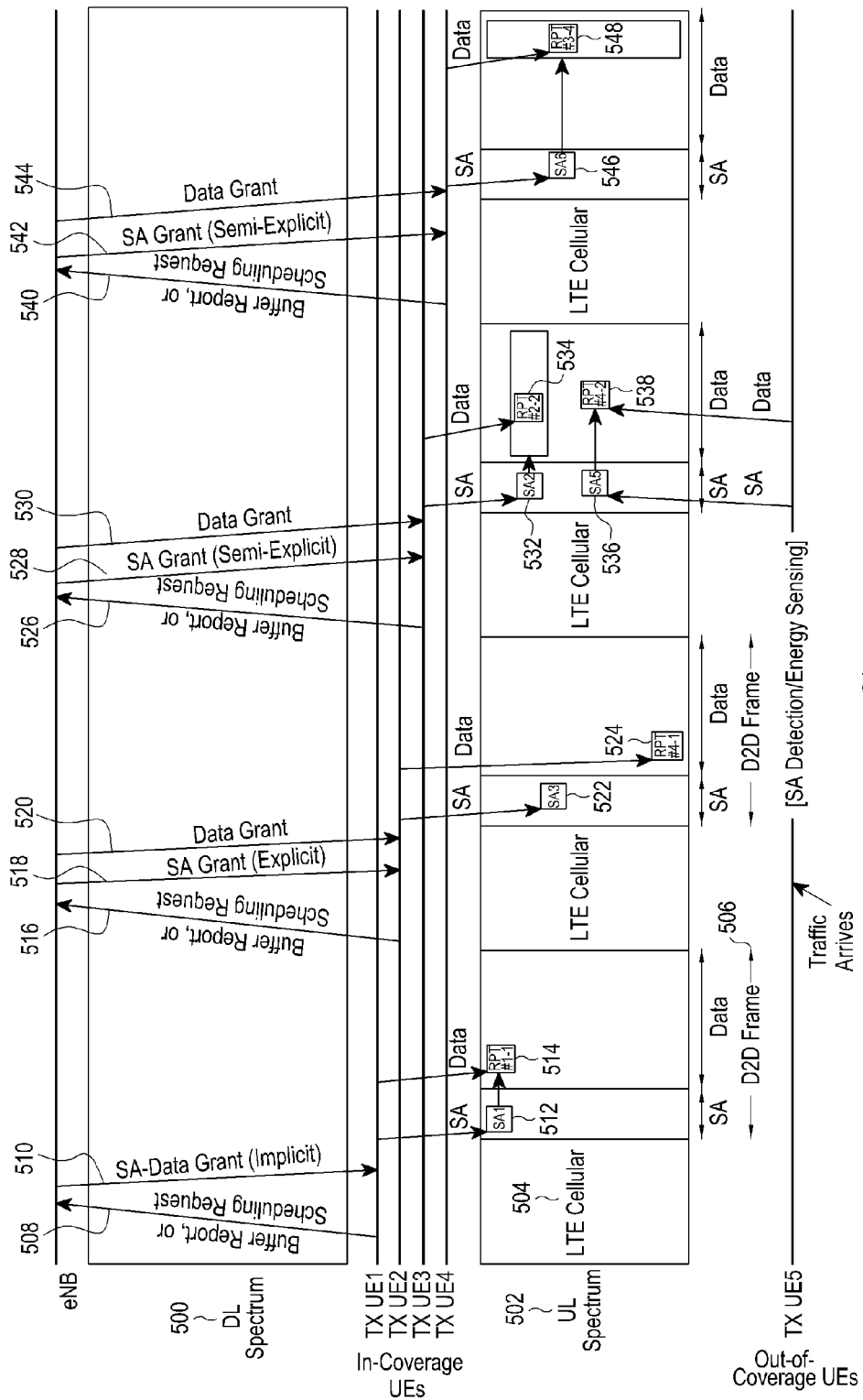
FIG. 5 is a view illustrating an example of a resource allocation and signaling procedure in a D2D system according to an embodiment of the present disclosure.

FIG. 5 is a view illustrating an example of a resource allocation and signaling procedure in a D2D system according to an embodiment of the present disclosure.

FIG. 5 illustrates a DL spectrum 500 and a UL spectrum 502 as resources available in the LTE system. LTE UL resources may be used in D2D communication, and the UL spectrum 502 may recursively include D2D frames 506 and regions 504 for LTE cellular devices.

For in-coverage UEs, resources for SAs and data both are granted by the eNB. Out-of-coverage UEs, if resource pool information is available (e.g., if transferred by the in-coverage UEs), select transmission resources on their own.

Referring to FIG. 5, UE1, UE2, UE3, and UE4 are in-coverage UEs. In contrast, UE5 is an out-of-coverage UE.

For example, implicit signaling is used for UE1. In response to a Buffer Report or Scheduling Request at operation 508, the eNB transmits a single SA-data grant indicating usage of an SA1 512 and a linked RPT #1-1 514 at operation 510.

For example, explicit signaling is used for UE2. In response to a Buffer Report or Scheduling Request at operation 516, the eNB transmits an SA grant indicating an SA resource SA3 522 at operation 518 and may separately transmit a data grant indicating usage of a predetermined RPT #4-1 524 at operation 520.

For example, semi-explicit signaling is used for UE3. In response to a Buffer Report or Scheduling Request at operation 526, the eNB transmits an SA grant indicating an SA resource SA2 532 (implicitly indicating usage of resource set 2) at operation 528 and transmits a data grant explicitly indicating an exact subset index at operation 530, finally indicating usage of RPT #2-2 534.

For example, other semi-explicit signaling is used for UE4. In response to a Buffer Report or Scheduling Request at operation 540, the eNB transmits an SA grant indicating an SA resource SA6 546 (implicitly indicating usage of the subset of index 4) at operation 542 and transmits a data grant explicitly indicating an exact subset index at operation 544, finally indicating usage of RPT #2-4 548.

UE5, an out-of-coverage UE, may monitor usage of the channel and may select an unused SA/RPT for transmission based on implicit signaling. For example, UE5 may select SA5 536 and RPT #4-2 538 as an unused SA and an unused RPT, respectively.

Figure 6:
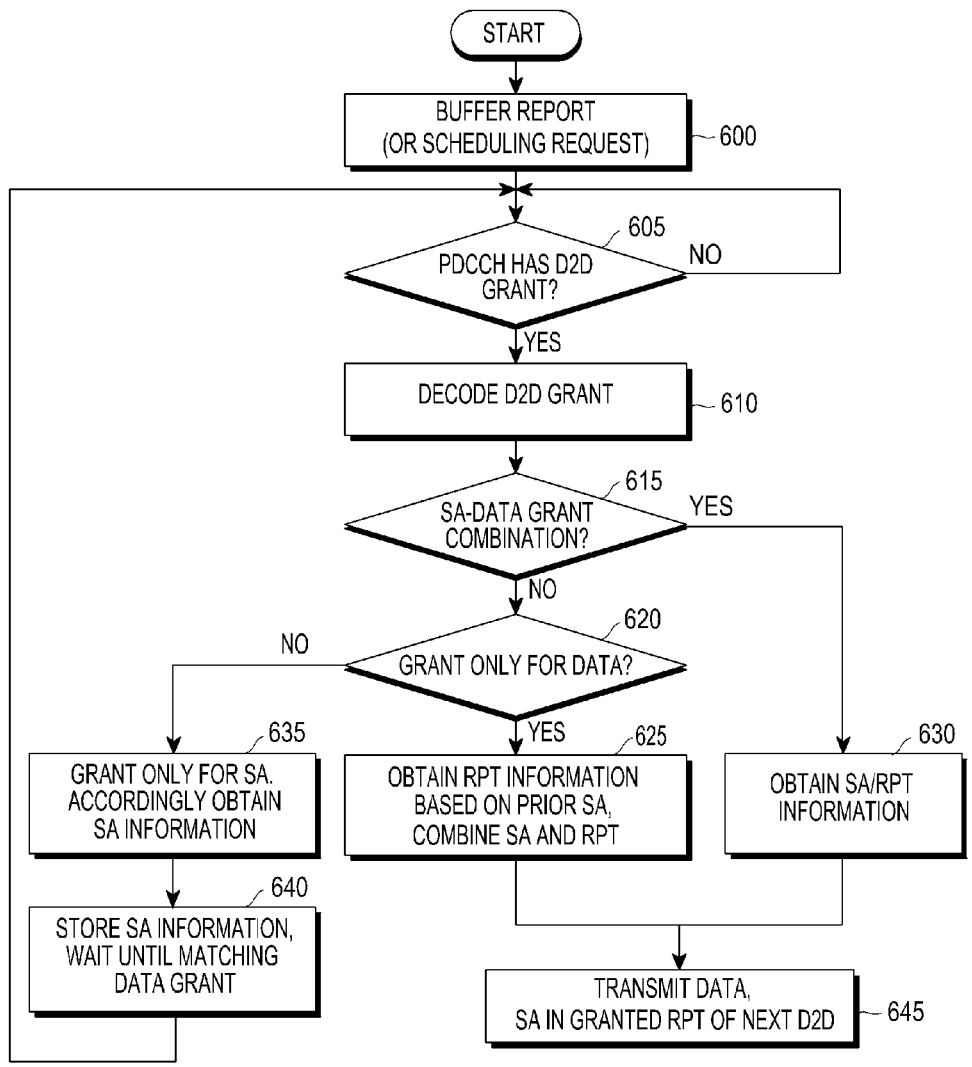
FIG. 6 is a view illustrating an example of a method for obtaining and transmitting scheduling assignment (SA)/resource pattern for transmission (RPT) information by an in-coverage mode D2D transmission user equipment (UE) according to an embodiment of the present disclosure.

FIG. 6 is a view illustrating an example of a method for obtaining and transmitting SA/RPT information by an in-coverage mode D2D transmission UE according to an embodiment of the present disclosure.

Referring to FIG. 6, the in-coverage D2D UE may send a buffer report or scheduling request to the eNB at operation 600.

The D2D UE checks the downlink control channel (e.g., physical downlink control channel (PDCCH)) for whether there is a D2D grant at operation 605.

In case it is checked at operation 605 that there is no D2D grant, the D2D UE may examine the PDCCH again.

In case it is checked at operation 605 that there is a D2D grant, the D2D UE may decode the D2D grant at operation 610.

The D2D UE checks whether the D2D grant is an SA-data combined grant or not at operation 615.

In case the D2D grant is an SA-data combined grant, the D2D UE obtains SA/RPT information at operation 630, transmits data in the granted RPT of the next D2D frame, and transmits an SA at operation 645.

In case the D2D grant is not the SA-data combined grant, the D2D UE checks whether the D2D grant is a grant only for data at operation 620.

Unless the D2D grant is a grant only for data, the D2D grant is a grant only for SAs, and thus, the D2D UE obtains SA information at operation 635 and may store the SA information and go to operation 605 to examine the PDCCH and wait until it matches the data grant at operation 640.

If the D2D grant is a grant only for data, the D2D UE may obtain RPT information, and based on the prior SA, combine the SA and RPT at operation 625, and may then transmit data in the granted RPT of the next D2D frame and transmit the SA at operation 645.

Figure 31:
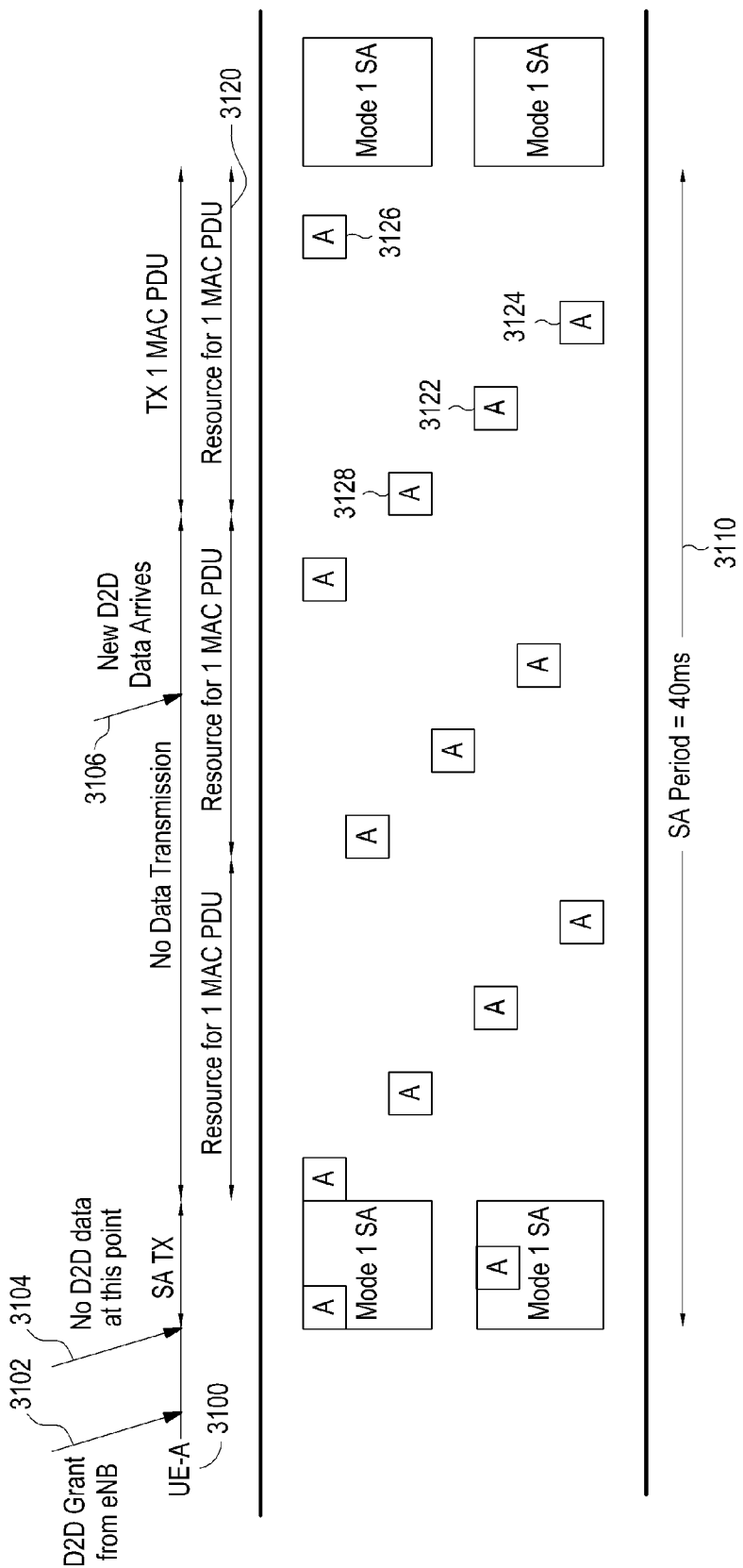
FIG. 31 is a view illustrating an example of an operation of a UE in case the UE receives a scheduling grant but has no data to transmit according to an embodiment of the present disclosure.

FIG. 31 is a view illustrating an example of an operation of a UE in case the UE receives a D2D grant but has no data to transmit according to an embodiment of the present disclosure.

Referring to FIG. 31, in case the UE receives a D2D grant from the eNB but has not data to transmit at the time that the SA is transmitted, the UE transmitter may operate one of the following options.

The first option is that the UE does not transmit an SA message.

The second option is that the UE transmits an SA message and indicates that there is no data to transmit.

The third option is that the UE transmits an SA message and indicates allocated data resource indexes (data RB index and T-RPT index). In a corresponding data resource, the UE abstains from data transmission until new data arrives. If the data arrives, the UE transmits the data from a predetermined next available resource for each MAC PDU.

For example, as shown in FIG. 31, although the UE-A 3100 receives a D2D grant from the eNB at operation 3102, the UE-A 3100 has no data to transmit at the time of SA message transmission at operation 3104. New data arrives in the UE-A 3100 in about 20 ms at operation 3106. In such case, the UE-A 3100 transmits the SA, but until before the new data arrives, does not transmit data. If the new data arrives, the UE-A 3100 transmits one MAC PDU in a set of four transmission opportunities 3122, 3124, 3126, and 3128 within the next resource 3120 for one MAC PDU. This scheme may reduce transmission delay of data packets.

In contrast, in the first option and the second option above, the UE abandons the transmission opportunity within the current transmission interval 3110. That is, in the first option and the second option, if new data is created within the transmission interval 3110, the created data cannot be transmitted. This is why in the first option and second option, the UE should wait for a new D2D grant to transmit the created data.

Figure 7:
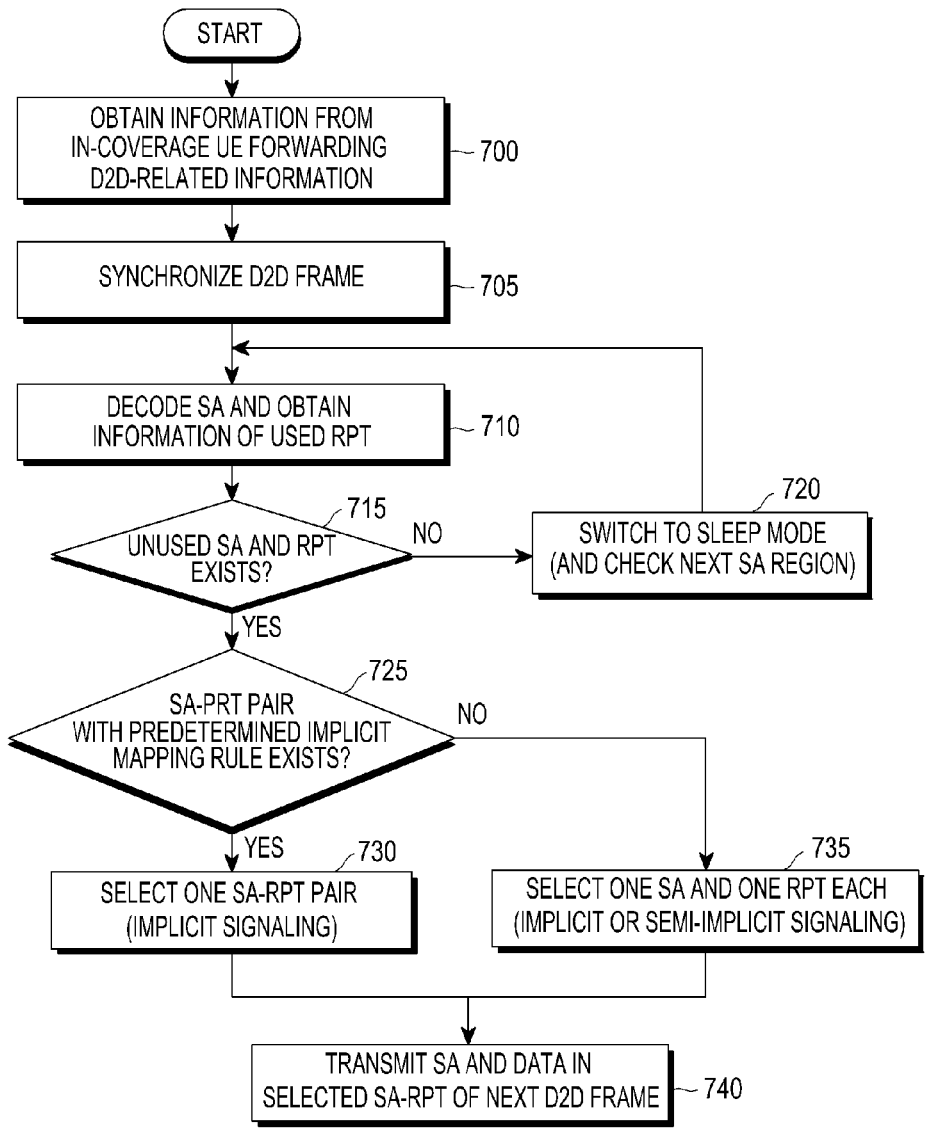
FIG. 7 is a view illustrating an example of a method for obtaining and transmitting SA/RPT information by an out-of-coverage D2D transmission UE with the aid of an in-coverage UE according to an embodiment of the present disclosure.

FIG. 7 is a view illustrating an example of a method for obtaining and transmitting SA/RPT information by an out-of-coverage D2D transmission UE with the aid of an in-coverage UE according to an embodiment of the present disclosure.

Referring to FIG. 7, the out-of-coverage D2D UE may obtain D2D-related i from the in-coverage UE at operation 700.

The out-of-coverage D2D UE synchronizes D2D frames using the D2D-related information at operation 705.

The out-of-coverage D2D UE decodes the SA and obtains information on the RPT being used at operation 710. As described above in connection with Table 4, the "Flag for SPS Indication" field in the SA contents may be used to determine the availability of the SA and data RPT. If the "Flag for SPS Indication" field is 1, the SA and RPT would also be used for the next D2D frame, and thus, it is regarded that the SA and RPT are unavailable (for other purposes). If the "Flag for SPS Indication" field is 0, the SA and RPT are considered to be available resources.

The out-of-coverage D2D UE checks if there are an unused SA and RPT at operation 715.

Unless it is checked at operation 715 that there are an unused SA and RPT, the out-of-coverage D2D UE switches to sleep mode at operation 720 and may go to operation 710 to check the next SA region.

If it is checked at operation 715 that there are an unused SA and RPT, the out-of-coverage D2D UE checks if there is an SA-RPT pair with a predetermined implicit mapping rule at operation 725.

If it is checked at operation 725 that there is an SA-RPT pair with the predetermined implicit mapping rule, the out-of-coverage D2D UE selects one SA-RPT pair at operation 730. In other words, the out-of-coverage D2D UE may select an SA-RPT pair through implicit signaling.

Unless it is checked at operation 725 that there is an SA-RPT pair with the predetermined implicit mapping rule, the out-of-coverage D2D UE selects one SA and one RPT each at operation 735. In other words, the out-of-coverage D2D UE may select an SA-RPT pair through explicit or semi-explicit signaling.

The out-of-coverage D2D UE transmits the SA and RPT in the SA-RPT of the next D2D frame using the selected SA-RPT at operation 740.

Figure 8:
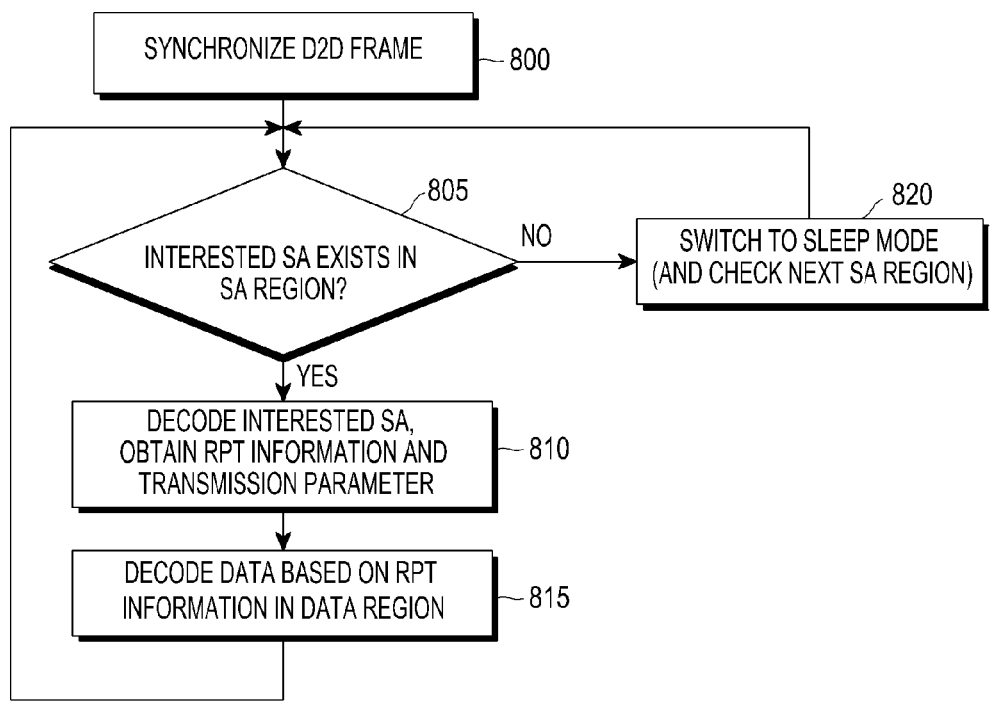
FIG. 8 is a view illustrating an example of an operation of a D2D reception UE according to an embodiment of the present disclosure.

FIG. 8 is a view illustrating an example of an operation of a D2D reception UE according to an embodiment of the present disclosure.

Referring to FIG. 8, the D2D UE synchronizes D2D frames using the obtained D2D-related information at operation 800.

The D2D UE checks the SA region for whether there is its interested SA at operation 805.

Unless it is checked at operation 805 that there is no interested SA, the D2D UE switches to sleep mode at operation 820 and may go to operation 805 to check the next SA region.

In case it is checked at operation 805 that there is the interested SA, the D2D UE may decode the interested SA to obtain RPT information and transmission parameters at operation 810, and based on the RPT information in the data region of the D2D frame, may decode the data at operation 815. At operation 810, the 'Mode Indication' field in the SA contents (Table 3 or Table 4) may be used to differentiate between the mode 1 case and the mode 2 case. The UE, at operation 815, may decode data while performing a proper operation in the data pool corresponding to mode 1 or mode 2 differentiated.

Figure 27:
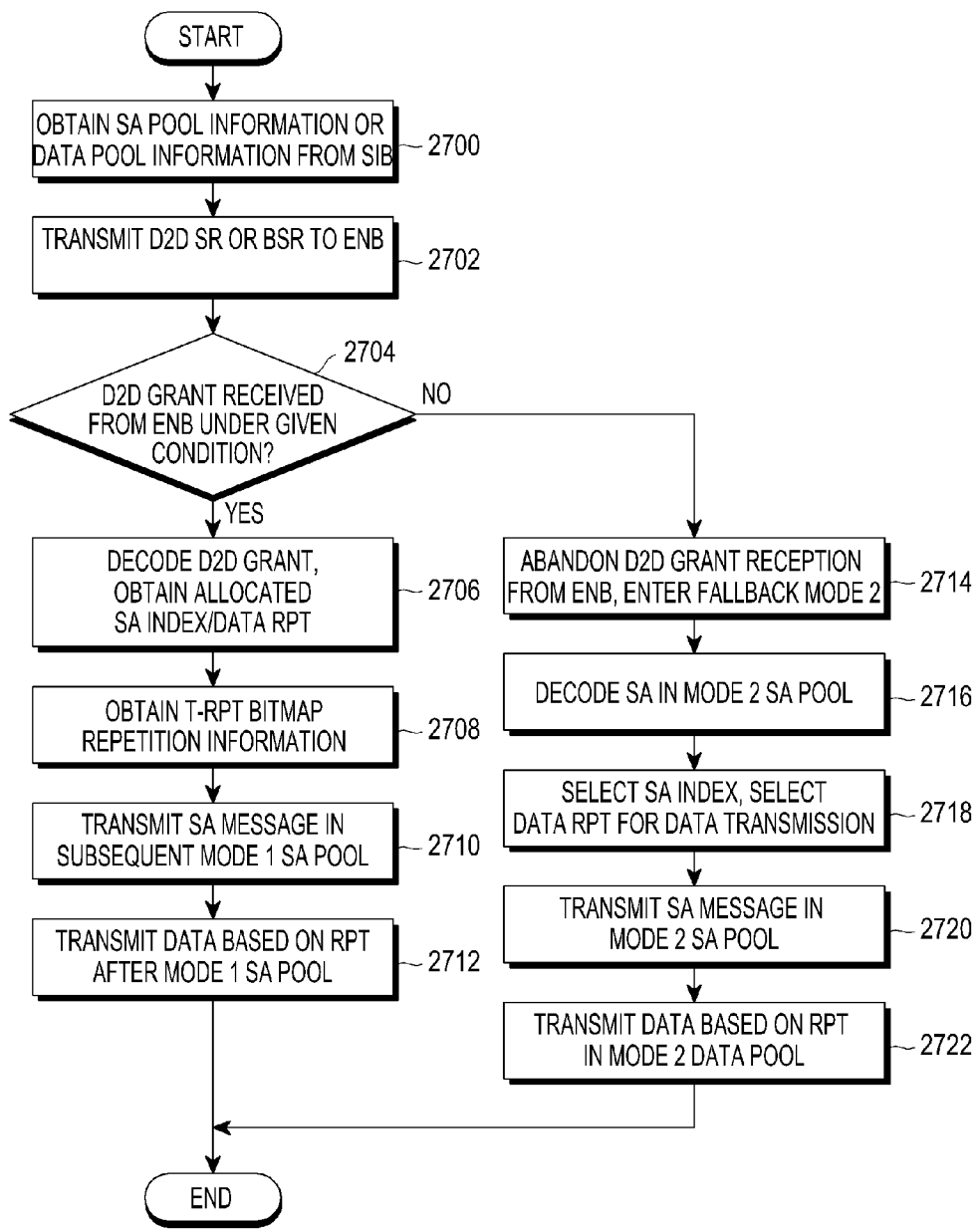
FIG. 27 is a view illustrating an example of a method in which an in-coverage UE transmitter operates in mode 1 and mode 2 according to an embodiment of the present disclosure.

FIG. 27 is a view illustrating a method in which an in-coverage UE transmitter operates in mode 1 and mode 2 according to an embodiment of the present disclosure.

Referring to FIG. 27, the in-coverage UE transmitter obtains the SA pool information or data pool information from the system information block (SIB) (received from the eNB) at operation 2700.

The UE transmitter sends, to the eNB, a D2D scheduling request (SR) or buffer status report (BSR) at operation 2702.

The UE transmitter checks if a D2D grant is received from the eNB under a predetermined condition at operation 2704.

If it is checked at operation 2704 that the D2D grant is received, the UE transmitter may operate in mode 1. In this case, the UE transmitter obtains allocated SA information or data RPT information from the D2D grant at operation 2706. The UE transmitter obtains T-RPT bitmap repetition information at operation 2708. The UE transmitter transmits an SA in the following mode 1 SA pool at operation 2710. The UE transmitter transmits data based on the obtained RPT after the mode 1 SA pool at operation 2712. That is, the UE transmitter, in mode 1, may transmit data immediately after the mode 1 SA pool.

Unless it is checked at operation 2704 that the D2D grant is received (e.g., during a predetermined period), the UE transmitter may abandon reception of a D2D grant from the eNB and fall back to mode 2 at operation 2714. In this case, the UE transmitter decodes the SA in the mode 2 SA pool at operation 2716. The UE transmitter selects one SA and selects a data RPT for data transmission at operation 2718. The UE transmitter transmits the SA in the mode 2 SA pool at operation 2720. The UE transmitter may transmit data based on the RPT in the mode 2 data pool at operation 2722.

Figure 28:
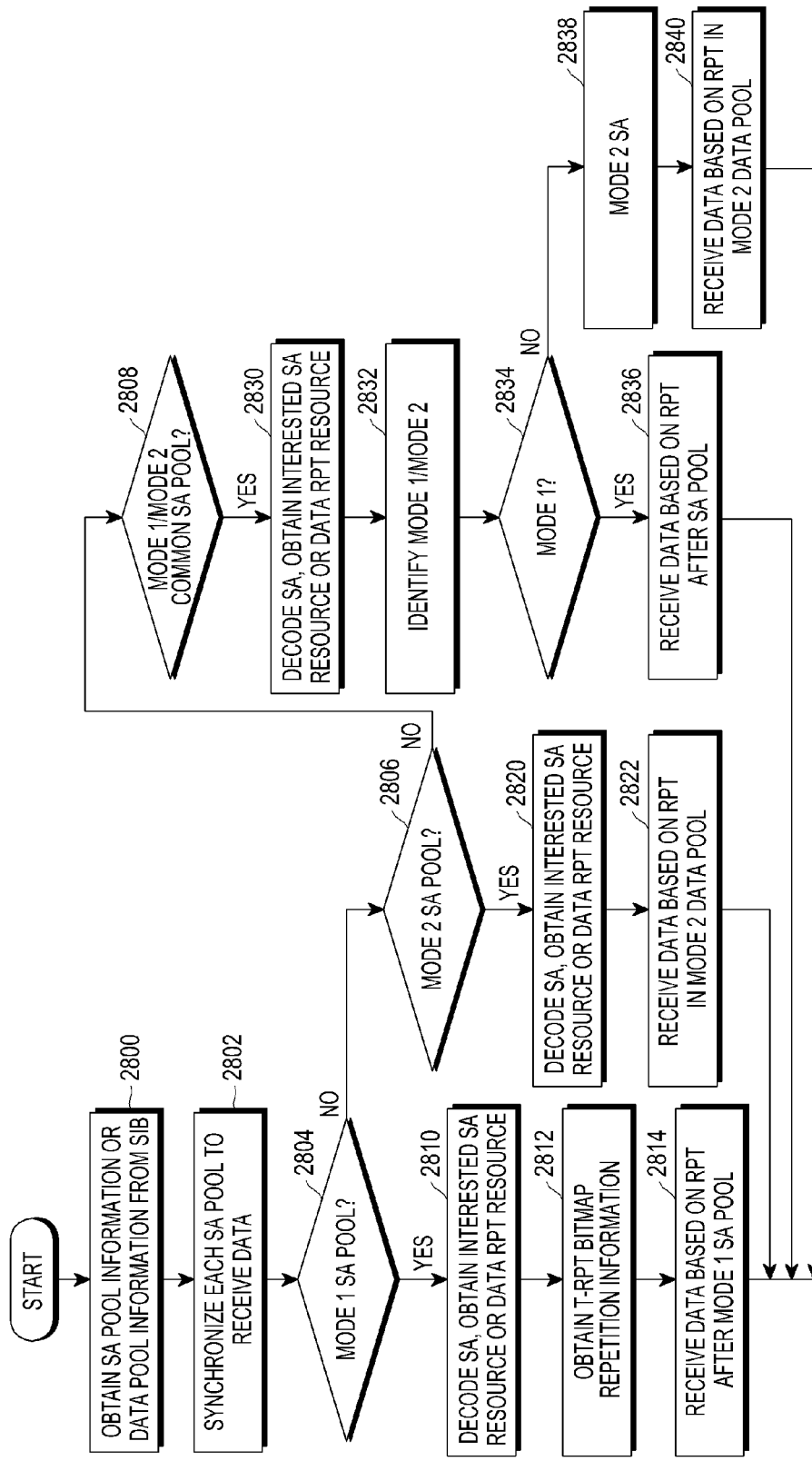
FIG. 28 is a view illustrating an example of a method in which an in-coverage UE receiver operates in different modes of an SA pool and a data pool according to an embodiment of the present disclosure.

FIG. 28 is a view illustrating an example of a method in which an in-coverage UE receiver operates in different modes of an SA pool and a data pool according to an embodiment of the present disclosure.

Referring to FIG. 28, the in-coverage UE receiver obtains the SA pool information or data pool information from the SIB at operation 2800.

The UE receiver synchronizes each SA pool to receive data at operation 2802.

The UE receiver determines whether the SA pool to use is the mode 1 SA pool, mode 2 SA pool, or a common SA pool for mode 1 and mode 2, using the obtained SA pool information. Specifically, as an example, the UE receiver may perform, in order, at least one of the operation of checking whether the SA pool to use is the mode 1 SA pool at operation 2804, the operation of checking whether the SA pool to use is the mode 2 SA pool at operation 2806, and the operation of checking whether the SA pool to use is the common SA pool for mode 1 and mode 2 at operation 2808. However, the order in which the operations are performed may be arbitrarily changed.

If it is checked at operation 2804 that the SA pool to use is the mode 1 SA pool, the UE receiver decodes the SA and obtains an interested SA resource or data RPT at operation 2810. In this case, the UE receiver may obtain T-RPT bitmap repetition information at operation 2812. The UE receiver may receive data based on the RPT after the mode 1 SA pool at operation 2814.

If it is checked at operation 2806 that the SA pool to use is the mode 2 SA pool, the UE receiver decodes the SA and obtains an interested SA resource or data RPT at operation 2820. The UE receiver may receive data based on the RPT in the mode 2 data pool at operation 2822.

If it is checked at operation 2808 that the SA pool to use is the common SA pool for modes 1 and 2, the UE receiver decodes the SA and obtains an interested SA resource or data RPT at operation 2830. In this case, the UE receiver may identify whether the decoded SA is of mode 1 or mode 2 at operation 2832. The UE receiver checks whether the decoded SA is a mode 1 SA at operation 2834. If it is checked at operation 2834 that the decoded SA is of mode 1, the UE receiver receives data based on the RPT after the SA pool at operation 2836. Unless it is checked at operation 2834 that the decoded SA is of mode 1, the UE determines that it is of mode 2 at operation 2838 and receiver receives data based on the RPT in the mode 2 data pool at operation 2840.

Figure 29:
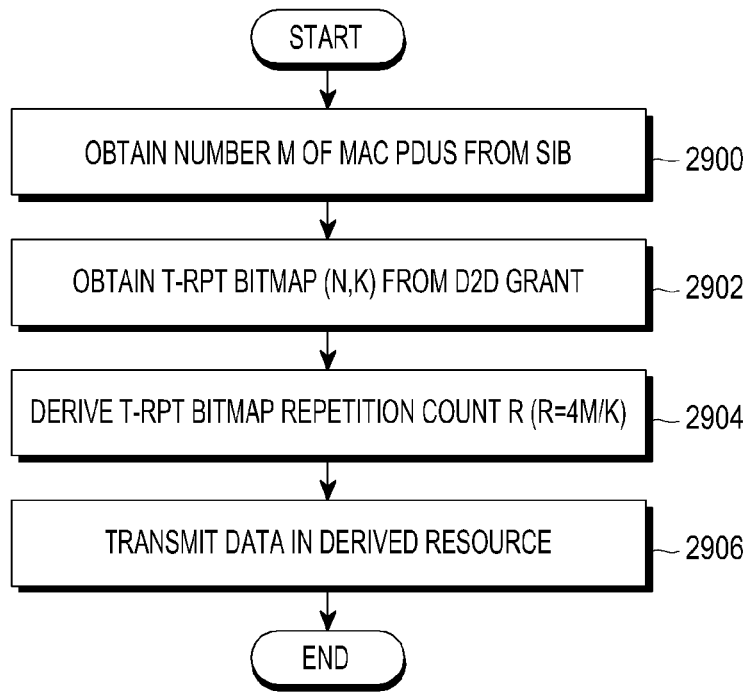
FIG. 29 is a view illustrating an example of a procedure in which an in-coverage UE transmitter obtains time domain RPT (T-RPT) bitmap repetition information when the number of transmission medium access control (MAC) protocol data units (PDUs) is set by a system information block (SIB) for mode 1 according to an embodiment of the present disclosure.

FIG. 29 is a view illustrating an example of a procedure in which an in-coverage UE transmitter obtains T-RPT bitmap repetition information when the number of transmission MAC PDUs is set by an SIB for mode 1 according to an embodiment of the present disclosure.

Referring to FIG. 29, the procedure shown therein may be a detailed procedure of operation 2708 of FIG. 27.

The in-coverage UE transmitter obtains the number M of transmission MAC PDUs from the SIB at operation 2900.

The UE transmitter obtains a T-RPT bitmap (N,k) from the D2D grant at operation 2902.

The UE transmitter derives a T-RPT bitmap repetition count using the Equation "R=4M/k." at operation 2904

The UE transmitter transmits data in resources using the derived information at operation 2906.

Figure 30:
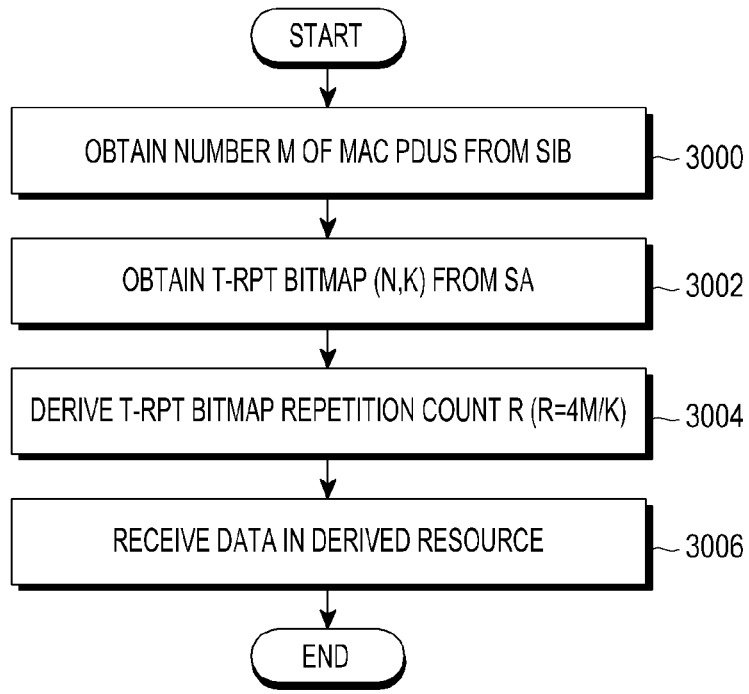
FIG. 30 is a view illustrating an example of a procedure in which an in-coverage UE receiver obtains T-RPT bitmap repetition information when the number of transmission MAC PDUs is set by an SIB for mode 1 according to an embodiment of the present disclosure.

FIG. 30 is a view illustrating an example of a procedure in which an in-coverage UE receiver obtains T-RPT bitmap repetition information when the number of transmission MAC PDUs is set by an SIB for mode 1 according to an embodiment of the present disclosure.

Referring to FIG. 30, the procedure shown therein may be a detailed procedure of operation 2812 of FIG. 28.

The in-coverage UE receiver obtains the number M of transmission MAC PDUs from the SIB at operation 3000.

The UE receiver obtains a T-RPT bitmap (N,k) from the SA at operation 3002.

The UE receiver derives a T-RPT bitmap repetition count using the Equation "R=4M/k." at operation 3004

The UE receiver receives data in resources using the derived information at operation 3006.

Figure 9:
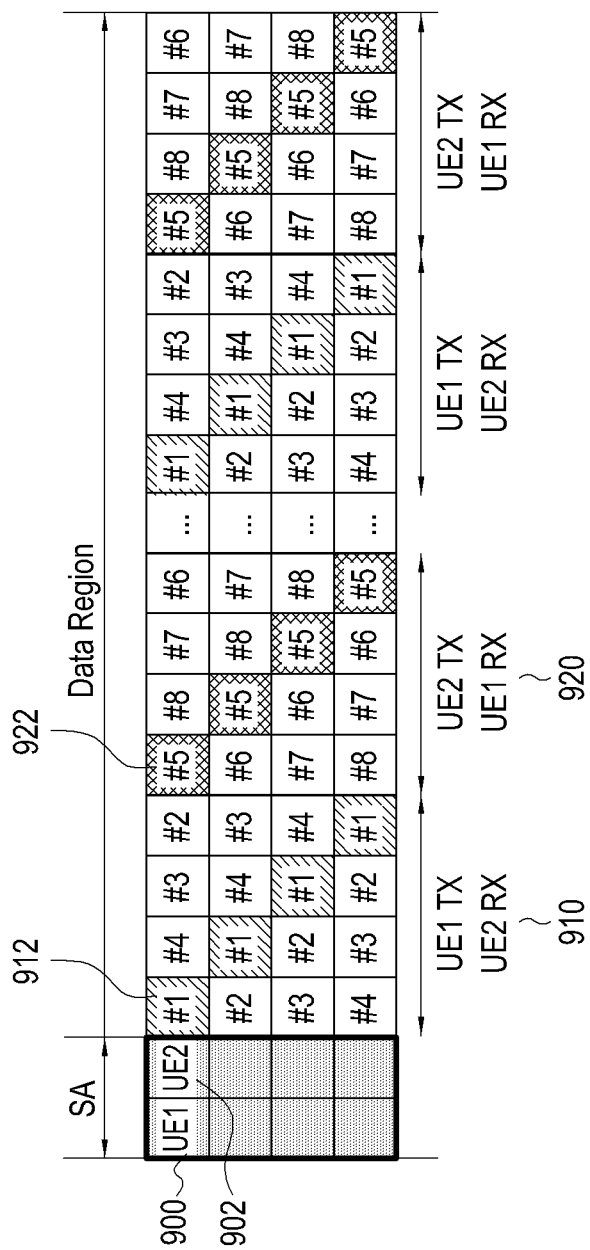
FIG. 9 is a view illustrating an example of resource allocation to address a half-duplex issue according to an embodiment of the present disclosure.

FIG. 9 is a view illustrating an example of resource allocation to address a half-duplex issue according to an embodiment of the present disclosure.

Referring to FIG. 9, by the unique nature of D2D communication, additional information for D2D communication scheduling may be considered as a reference. For example, when UEs (UE1 and UE2) belonging to the same group and required for transmission and reception therebetween are scheduled in the same D2D frame, the eNB may allocate different SA/resource patterns to prevent an overlap in the time domain. Specifically, the resource pattern may be determined so that UE 1 uses a sub region 910 as a transmission region and UE2 uses the sub region 910 as a reception region. Further, the resource pattern may be determined so that UE1 uses a sub region 920 as a reception region and UE2 uses the sub region 920 as a transmission region. For example, SAs 900 and 902 for UE1 and UE2 in the SA region are linked to a resource set #1 (912) and a resource set #5 (922), respectively.

UE1 and UE2 may receive signals (here) therebetween using the resource pattern scheduled so, and thus, the problem with half-duplex may be addressed.

In particular, in the case of out-of-coverage UEs, the transmitting UE may favor selecting a resource pattern that does not overlap, in the time domain, a resource pattern selected by another UE in the same group.

Figure 14:
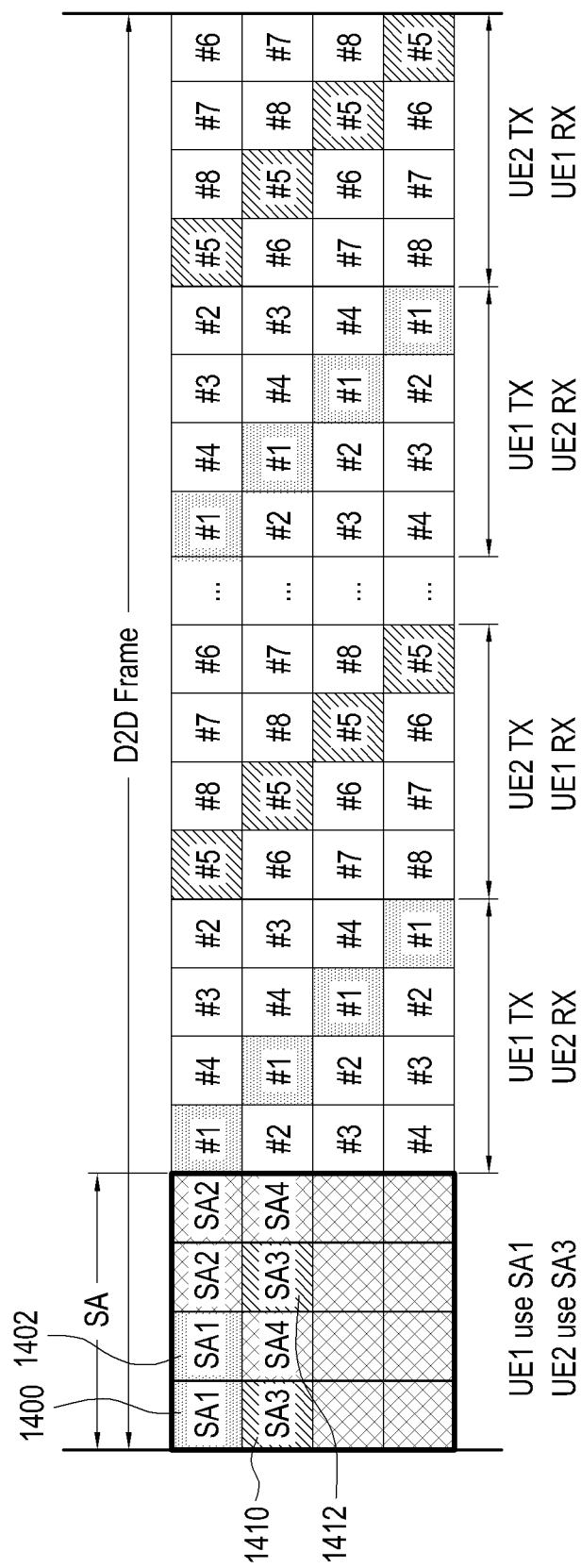
FIG. 14 is a view illustrating examples of SA patterns to avoid half-duplex limitation according to an embodiment of the present disclosure.

FIG. 14 is a view illustrating examples of SA patterns to avoid half-duplex limitation according to an embodiment of the present disclosure.

Referring to FIG. 14, each SA may be repeated several times by a preset pattern.

As shown in FIG. 14, UE1 uses SA1's 1400 and 1402, and UE2 uses SA3's 1410 and 1412. In the first time unit, UE1 and UE2 respectively transmit SAs 1400 and 1410 and thus do not hear each other. However, UE 1 and UE2 may hear their respective second SAs 1402 and 1412 because the second SAs 1402 and 1412 are not simultaneously transmitted. In other words, the second SAs 1402 and 1412 are transmitted in different time units. This is useful when UE1 and UE1 are in the same group and need to hear each other.

Several additional options for the SA pattern are described. It may be assumed that the SA resource pool has Nf resource blocks in the frequency domain and Nt sub-frames in the time domain. Each SA occupies one sub-frame in the time domain and one RB in the frequency domain.

From the resource index of the first SA, the resource index of the second SA may be derived. For example, the time index of the second SA may be derived from the time index of the first SA with any offset, and the frequency index of the second SA may be derived from the frequency index of the first SA with any offset or frequency hopping pattern. Or, the time and frequency index of the second SA may be derived from a function for both the time and frequency index of the first SA.

Based on the above scheme, linkage between two SAs used in one UE may have a number of options.

FIGS. 25A, 25B, 25C, and 25D are views illustrating examples of linkage between two SAs used by one UE according to various embodiments of the present disclosure.

Figure 25A:
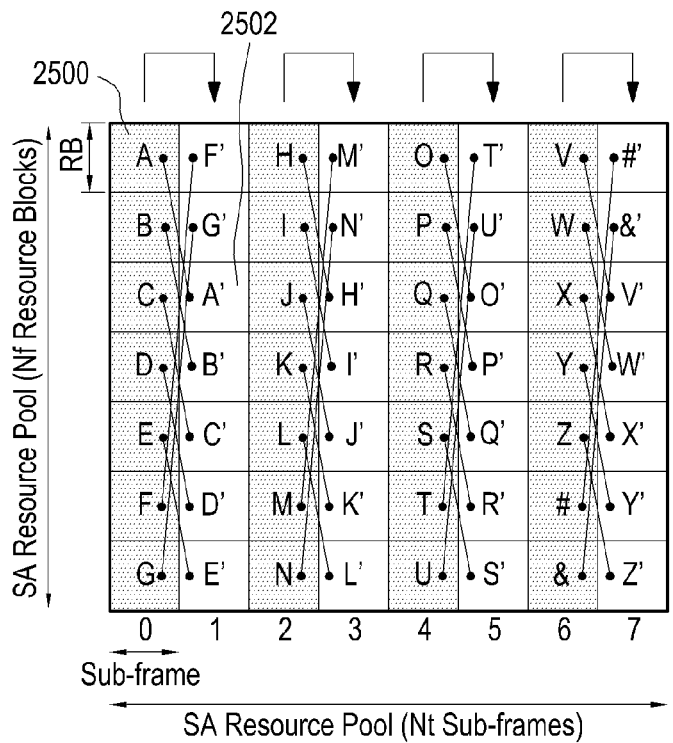
FIGS. 25A, 25B, 25C, and 25D are views illustrating examples of linkage between two SAs used by one UE according to various embodiments of the present disclosure.

Referring to option 1 of FIG. 25A, the two SAs used by the same UE remain contiguous in the time domain. The first SA transmission is always in sub-frames with even-numbered indexes (e.g. 0, 2, 4, . . . ), and the second SA transmission (repetition of the first SA transmission) is always in the subsequent sub-frames (e.g., indexes are 1, 3, 5, . . . ). As an example, the linkage between the 0th SA (initial transmission) of the UE and the first SA (repetition) may be linkage between resource block A 2500 of the 0th sub-frame and resource block A' 2502 of the first sub-frame. A frequency hopping rule may be further considered in determining the linkage between the two SAs. The above-described data frequency hopping rules (type 1 and type 2) may be used for SA frequency hopping as well.

Figure 25B:
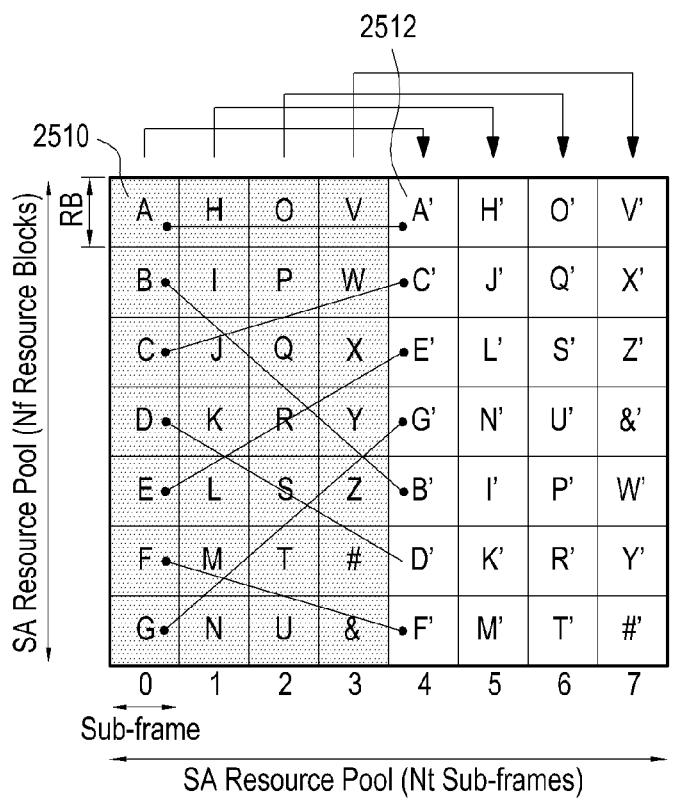

Referring to option 2 of FIG. 25B, the two SAs used by the same UE are not contiguous in the time domain. Accordingly, option 2 may have an additional time diversity over option 1. The second SA has a time domain offset from the first SA used by the same UE. As an example, the linkage between the 0th SA (initial transmission) of the same UE and the first SA (repetition) may be linkage between resource block A 2510 of the 0th sub-frame and resource block A' 2512 of the fourth sub-frame. In this case, the time domain offset is 4.

Figure 25C:
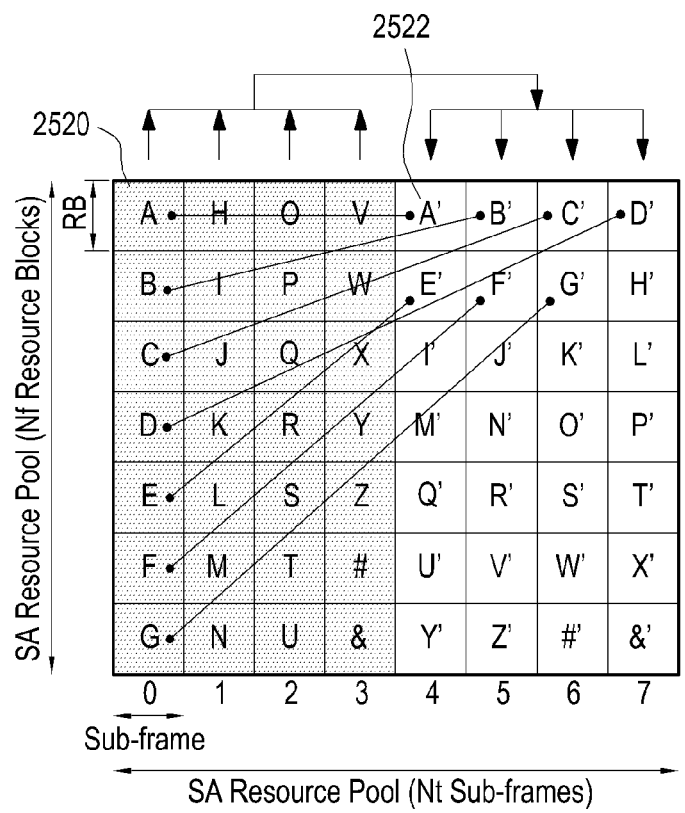

Referring to option 3 of FIG. 25C, the first SA is always in the first half of the time domain, and the second SA is in the second half of the time domain. There may be a predefined linkage rule for the two SAs used by the same UE. As an example, the linkage between the 0th SA (initial transmission) of the same UE and the first SA (repetition) may be linkage between resource block A 2520 of the 0th sub-frame and resource block A' 2522 of the fourth sub-frame.

Figure 25D:
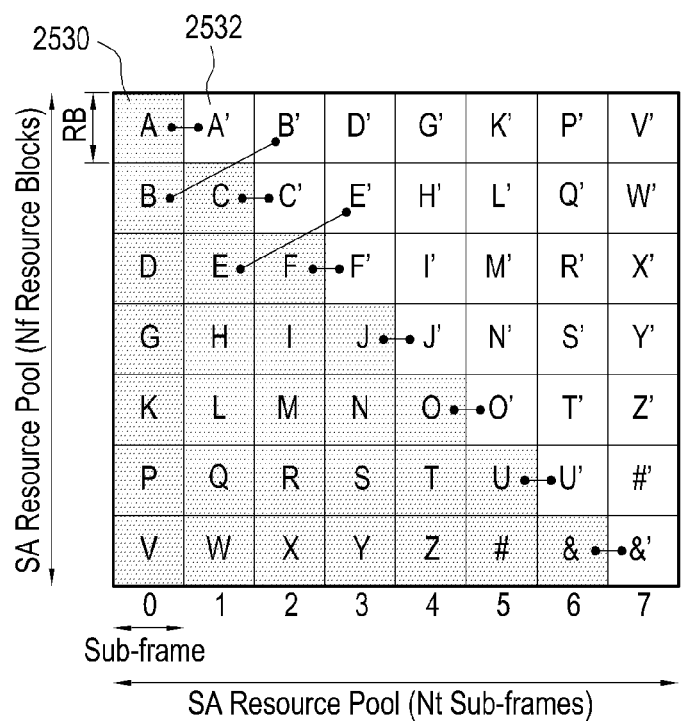

Referring to option 4 of FIG. 25D, the resources by which the first SA may be transmitted take up a half of all the resources, which may be shaped as a triangle. Further, the second SA occupies the remaining half shaped as a triangle. There may be a predefined linkage rule for the two SAs used by the same UE. As an example, the linkage between the 0th SA (initial transmission) of the same UE and the first SA (repetition) may be linkage between resource block A 2530 of the 0th sub-frame and resource block A' 2532 of the first sub-frame.

Described are mathematical expressions for the options of the SA patterns. It may be assumed that the first SA has an index ($nt0$, $nf0$). Here, $nt0$ denotes a sub-frame in the time domain, and $nf0$ denotes a resource block (RB) in the frequency domain.

In options 1 and 2 above, the index ($nt1$, $nf1$) of the second SA may be defined as follows.

$$\begin{cases} nt1 = \mod(nt0 + a, Nt) \\ nf1 = \mod(b \times nf0 + c \times [Nf/2] + d, Nf) \end{cases} \quad \text{Equation 7}$$

Here, a, b, c, and d are predefined parameters and are cell-specific. Nt denotes the number of sub-frames in the time domain, and Nf denotes the number of resource blocks in the frequency domain in the SA resource pool.

In option 3 above, the index ($nt1$, $nf1$) of the second SA may be defined as follows.

$$\begin{cases} nt1 = \mod\left(a \times nf0 + nt0 \times Nf + b, \dfrac{Nt}{2}\right) + \dfrac{Nt}{2} \\ nf1 = \mod\left(\left\lfloor \dfrac{nf0 + nt0 \times Nf}{Nt/2} \right\rfloor + c, Nf\right) \end{cases} \quad \text{Equation 8}$$

Here, a, b, and c are predefined parameters and are cell-specific.

In option 4 above, the index ($nt1$, $nf1$) of the second SA may be defined as follows.

$$\begin{cases} nt1 = \mod(a \times nf0 + b, Nt) \\ nf1 = \mod(c \times nt0 + d, Nf) \end{cases} \quad \text{Equation 9}$$

Here, a, b, c, and d are predefined parameters and are cell-specific.

Design of resources for D2D discovery is now described with reference to FIGS. 15 to 17.

D2D UEs may transmit discovery messages in one or multiple DRUs in each discovery period. If multiple DRUs are used by one UE, repetitive transmission of discovery messages is useful to increase discovery coverage, and particularly when a power control technique applies, it is useful to UEs performing low-power transmission. The number of DRUs used for repetitive transmission may be preset by the network depending on the size of network, density of UEs, and transmission environments. If the number (e.g., K) of DRUs for repetitive transmission is given, the indexes of DRUs used in the same UE may be predefined or derived by a deterministic linkage rule.

The DRUs for the same UE may be denoted DRU pair or linked DRU pair. If the UE transmits discovery messages in the DRUs of any discovery period, the indexes of DRUs used for transmission in the subsequent discovery period may be derived by the resource hopping rule. The resource hopping rule may include a DRU hopping pattern and a DRU pair hopping pattern.

If the index of URU to be used in the UE is given in any discovery period, the DRU hopping pattern defines a hopping rule for deriving the index of a DRU to be used by the UE in the subsequent discovery period. If the UE uses the DRUs belonging to the same predefined DRU pair in any discovery period, the DRUs used by the UE in the subsequent discovery period might not in the predefined DRU pair. In such case, the DRUs that are used by the UE and not present in the same predefined DRU pair may be denoted a virtual DRU pair.

The DRU pair hopping pattern defines a hopping rule for deriving the index of a DRU pair used in the UE in the subsequent discovery period. That is, the DRUs belonging to the same predefined DRU pair may be used by the same UE. As per the frequency hopping rule, only DRU hopping may be used, only DRU pair hopping may be used, or a combination of DRU hopping and DRU pair hopping may be used. For example, a DRU pair hopping interval M ($1<M<\infty$) may be defined by indicating how DRU hopping and DRU pair hopping are combined. In other words, DRU pair hopping may be used once for M discovery periods, and DRU hopping may be used in each discovery period constituting the M discovery periods. If M=1, only DRU pair hopping is used, and if M=$\infty$, only DRU hopping is used. In other cases, DRU hopping and DRU pair hopping are used together. M may be present, and may be signaled by the network.

Figure 15A:
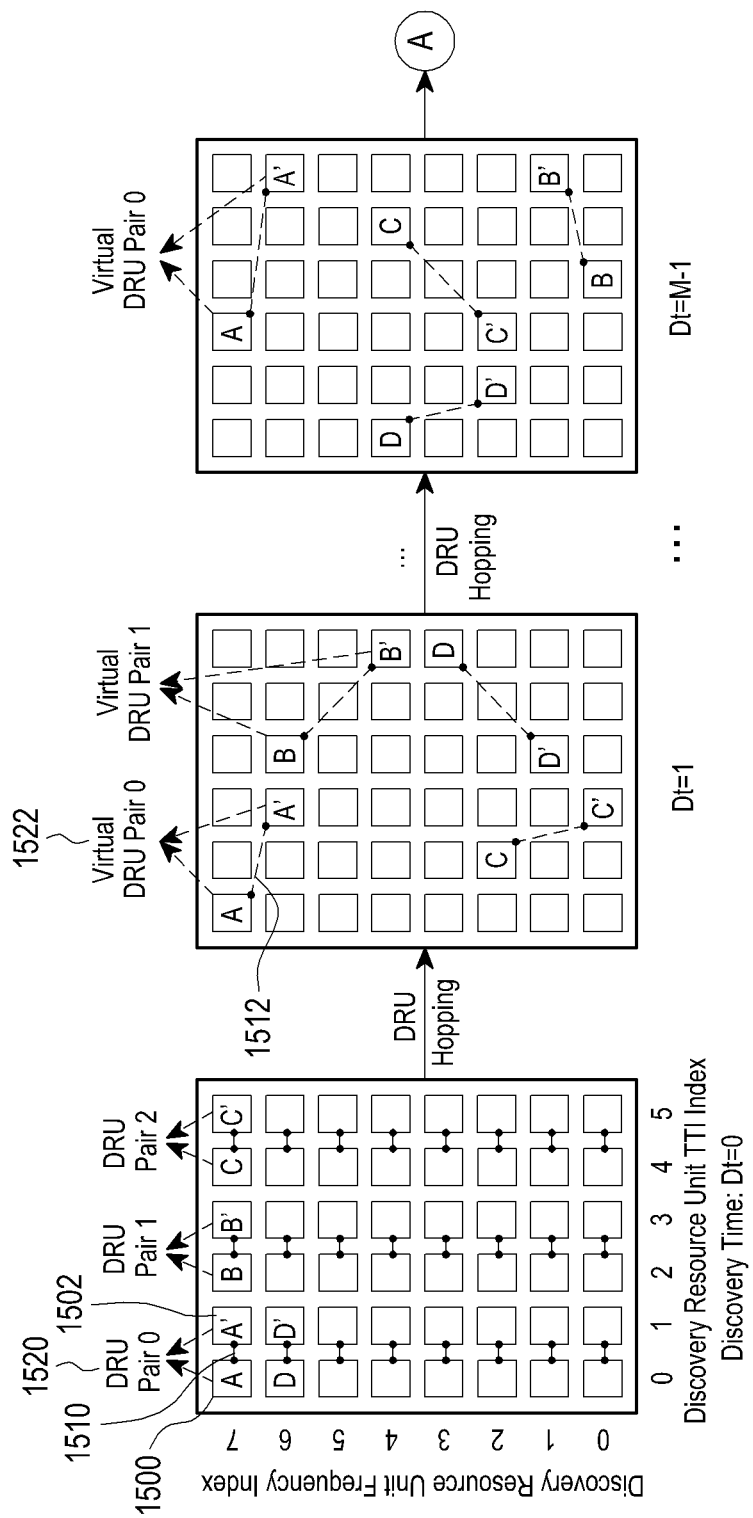
FIGS. 15A and 15B are views illustrating an example of a D2D discovery resource hopping method according to an embodiment of the present disclosure.
Figure 15B:
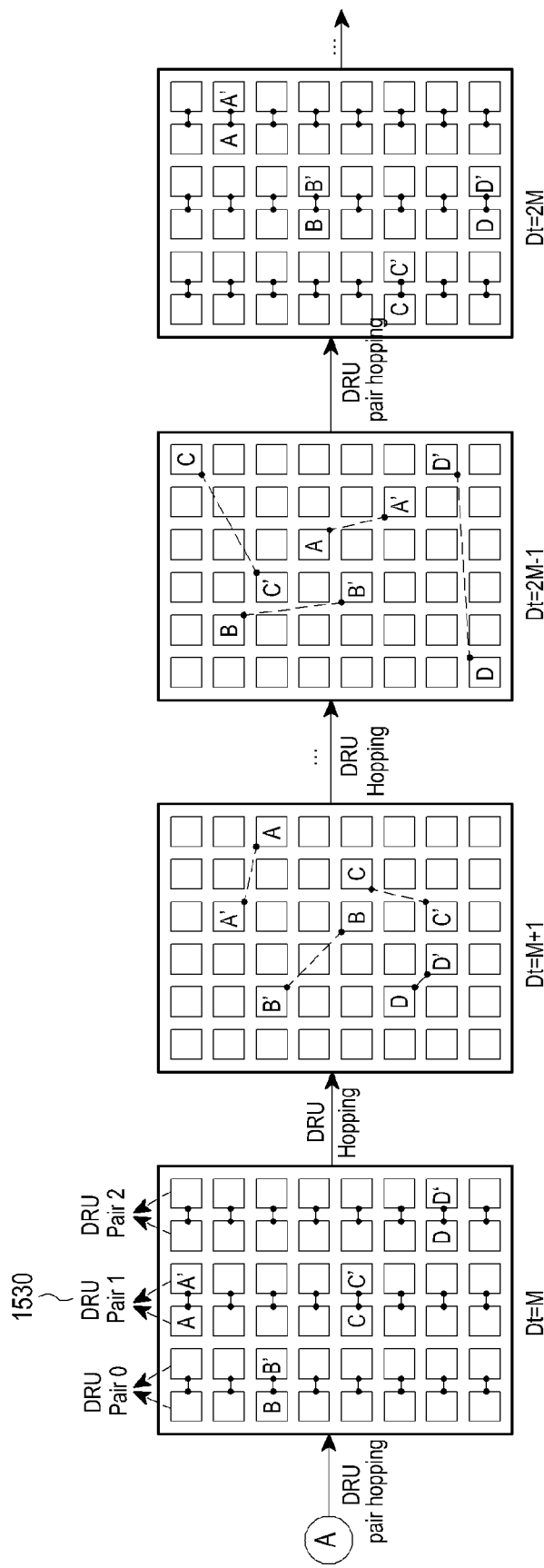

FIGS. 15A and 15B are views illustrating an example of a D2D discovery resource hopping method according to various embodiments of the present disclosure.

Referring to FIGS. 15A and 15B, the squares (e.g., reference numeral 1500) denoted in As are DRUs used for the UE-A to transmit discovery messages, and the squares (e.g., reference numeral 1502) denoted in A's are DRUs used for the UE-A to transmit repetitions of discovery messages. The solid lines (e.g., reference numeral 1510) between the squares 1500 denoted in As and the squares 1502 denotes in A's are preset DRU pair (e.g., reference numeral 1520) lines used by the same UE-A, and the dashed lines (e.g., reference numeral 1512) between the squares denoted in As and the squares denoted in A's are virtual DRU pair (1522) lines used by the same UE.

Referring to FIG. 15A, one discovery period may include 48 DRUs (Nt=6, Nf=8). Each DRU may be denoted with a joint index of time and frequency domains, e.g., <nt, nf ($0 \leq nt \leq 5$, $0 \leq nf \leq 7$). The number of DRUs in each DRU pair is two, which means that two times of transmission (K=2) is considered for one UE to transmit discovery messages. Accordingly, there may be 24 DRU pairs.

In discovery time 0 (Dt=0), the UE-A, UE-B, and UE-C, respectively, transmit discovery messages in DRU pair 0 1520, DRU pair 1, and DRU pair 2. DRU pair 0 1520 includes two consecutive DRUs, e.g., DRU<nt=0, nf=7>1500 and DRU<nt=1,nf=7>1502. In a subsequent discovery time 1 (Dt=1), DRUs to be used are changed by the DRU hopping rule. For example, the UE-A uses DRU<nt=0,nf=7> and DRU<nt=2,nf=6>, and these DRUs do not belong to the predefined DRU pair any longer, and are thus denoted DRU pair 0 1522. In discovery time M−1 (Dt=M−1), DRUs used are different from each other, but virtual DRU pairs are always connected. For example, the UE-A always uses virtual DRU pair 0.

Referring to FIG. 15B, DRU pair hopping is used in discovery time M (Dt=M). For example, the UE-A is hopped to use a predefined DRU pair 1 1530. DRU pairs to be used for other UEs are changed likewise. By doing so, resource hopping goes on based on DRU hopping and DRU pair hopping rules.

Figure 16:
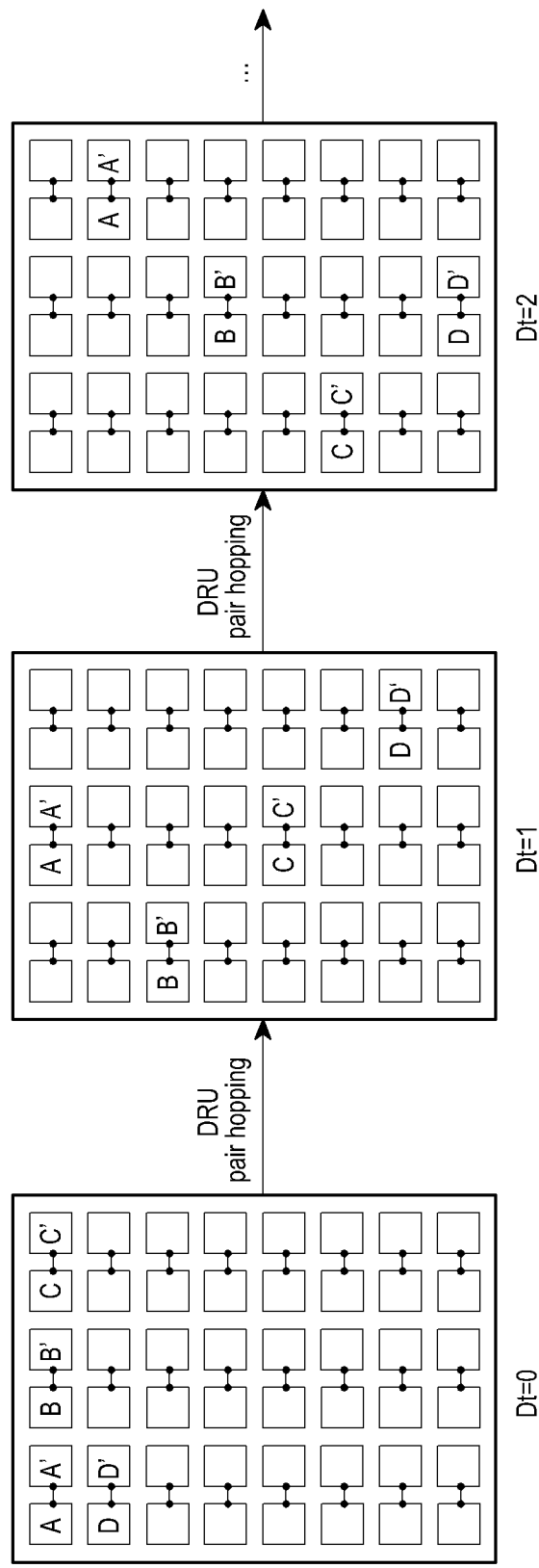
FIG. 16 is a view illustrating an example of a D2D discovery resource hopping method in case only discovery resource unit (DRU) pair hopping applies according to an embodiment of the present disclosure.

FIG. 16 is a view illustrating an example of a D2D discovery resource hopping method in case only DRU pair hopping applies according to an embodiment of the present disclosure.

Referring to FIG. 16, when M=1, only DRU pair hopping is used.

The discovery cycle, D_cycle, is, e.g., the number of radio frames and may be set as follows: D_cycle=1024, 512, 256, or 128. The discovery cycle may be broadcast in the system information. Accordingly, the time index dt of discovery period may be calculated as dt=SFN/D_cycle using the system frame number (SFN).

As exemplified in FIG. 16, from a point of view of system design, if the count of transmission per UE in a single discovery period (i.e., the number of DRUs in one pair) is larger than 1, only DRU pair hopping may be configured as default, and the count K of repeated transmission may be signaled in the system information. Such default configuration requires only signaling of the count K of repeated transmission in the system information and is thus simpler, demanding less signaling overhead.

If only one DRU per UE is transmitted, the hopping pattern may be generalized as follows.

Figure 17:
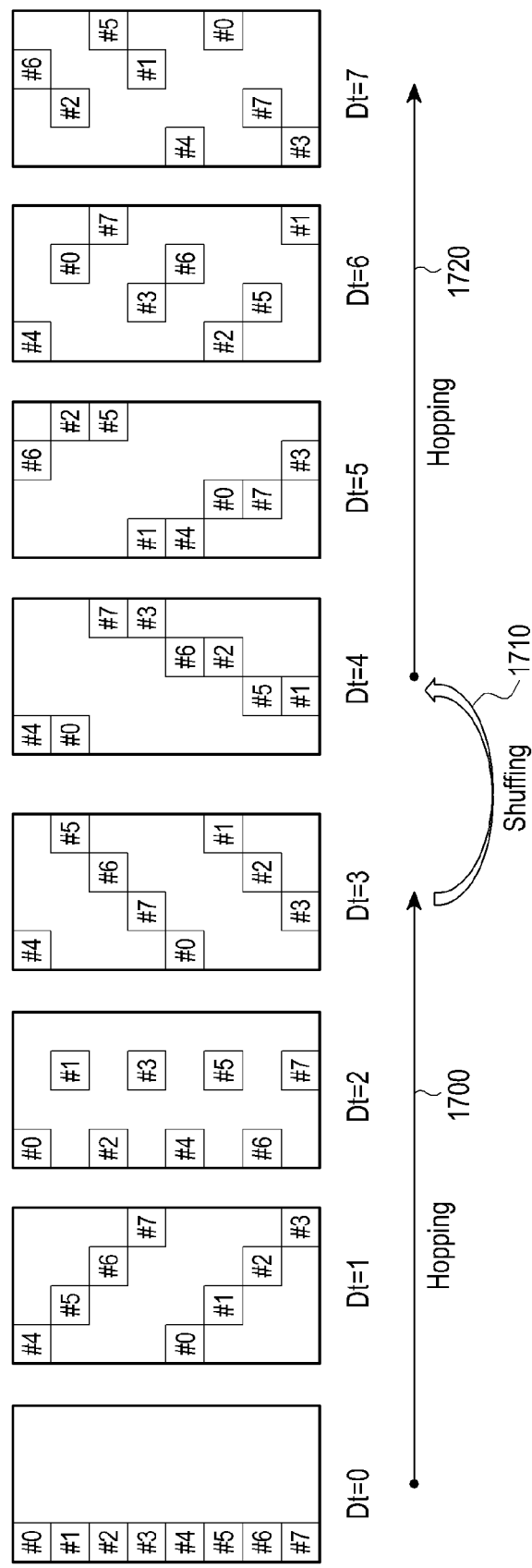
FIG. 17 is a view illustrating an example of a periodic shuffling method to address hidden UE issues according to an embodiment of the present disclosure.

FIG. 17 is a view illustrating an example of a periodic shuffling method to address hidden UE issues according to an embodiment of the present disclosure.

Referring to FIG. 17, periodic shuffling 1710 is used together with arbitrary hopping 1700 and 1720.

The periodic shuffling 1710 may periodically randomize the DRU array to enhance discovery performance. The shuffling period may be determined based on the discovery size and hopping function. In some scenarios, shuffling may enable two hidden UEs (or DRUs) to hear each other quickly. This allows for avoidance of endlessly repeated (persistent) hopping patterns.

Figure 18:
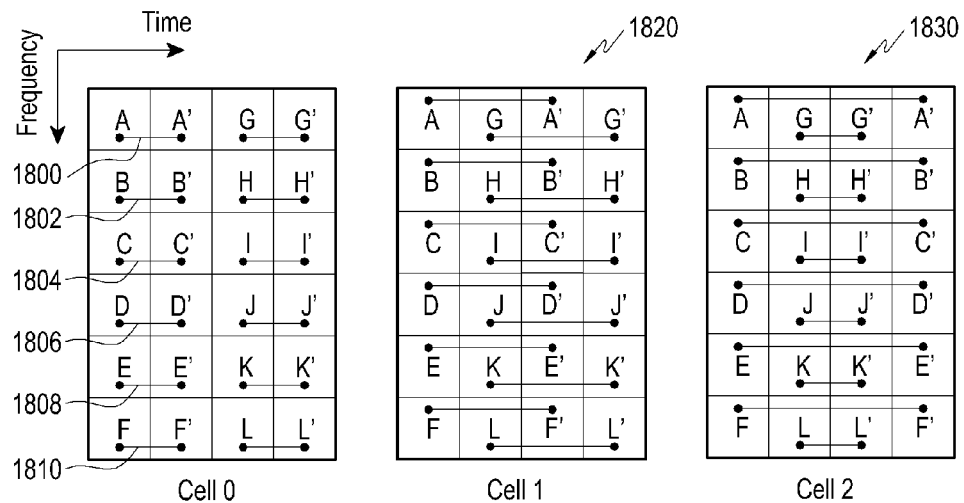
FIG. 18 is a view illustrating an example of a cell-specific DRU linkage pattern in case K=2 according to an embodiment of the present disclosure.
Figure 19:
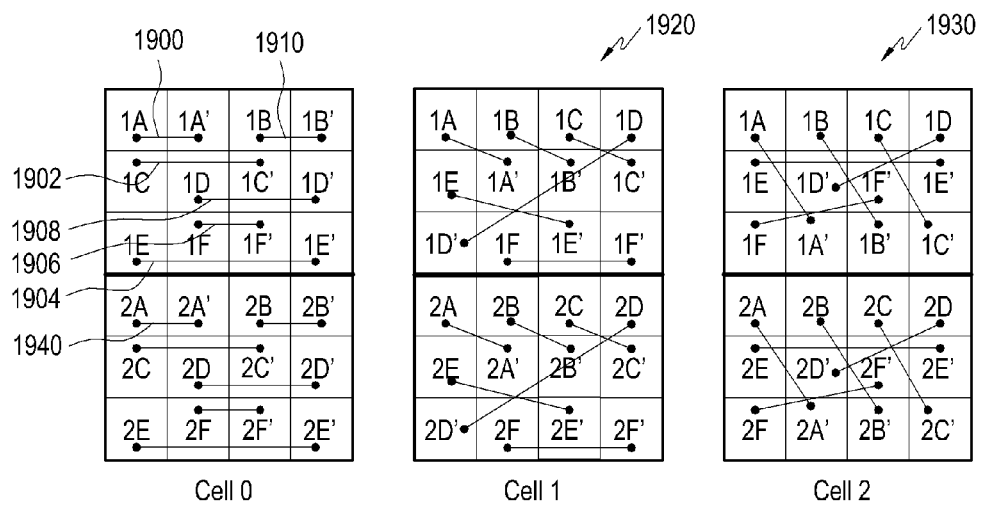
FIG. 19 is a view illustrating another example of a cell-specific DRU linkage pattern in case K=2 according to an embodiment of the present disclosure.
Figure 20:
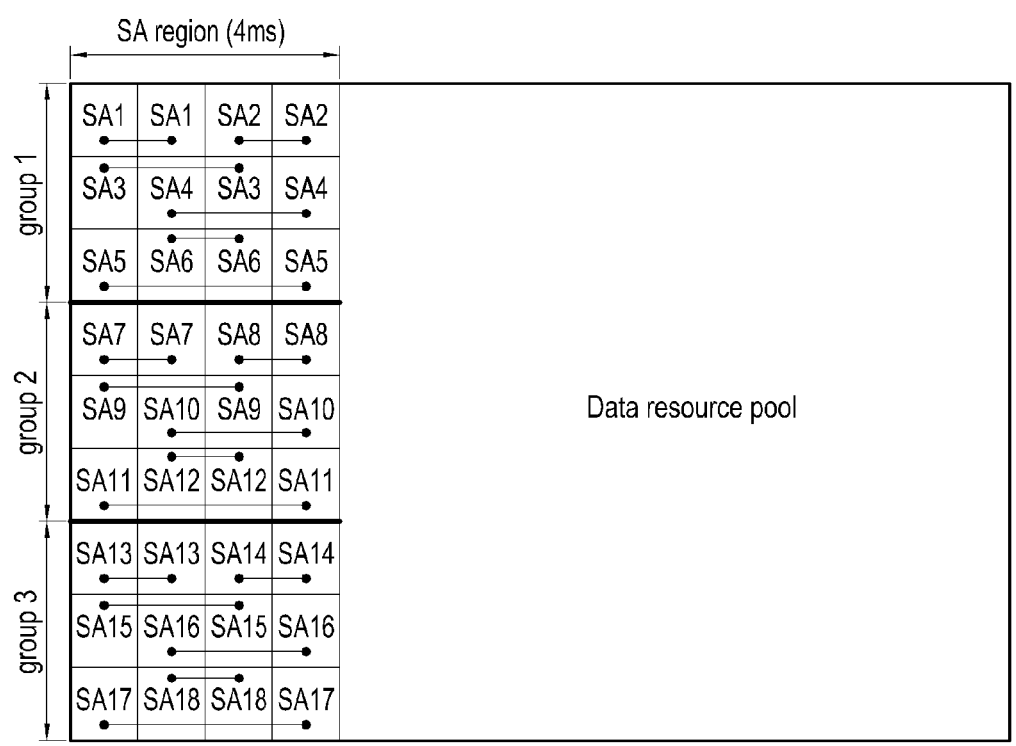
FIG. 20 is a view illustrating an example of a DRU pair linkage pattern applied to SA transmission according to an embodiment of the present disclosure.

Now described is design of a linkage pattern of a DRU pair with reference to FIGS. 18 to 20.

There may be a predefined DRU linkage pattern. The DRU linkage pattern is associated with the count of transmission of discovery messages and the size of discovery resource pool.

If a count of transmission of discovery messages is given, the DRU linkage pattern may be designed in various manners. For example, two consecutive DRUs are always configured in one DRU pair.

A joint DRU pair linkage pattern may be used by different cells. Further, the different cells may have different linkage patterns.

FIG. 18 is a view illustrating an example of a cell-specific DRU linkage pattern in case K=2 according to an embodiment of the present disclosure.

Referring to FIG. 18, an example in which K=2, and different cells have different DRU linkage patterns is illustrated. In this example, although the DRUs in one DRU pair have always the same frequency index, the DRUs have different time indexes (consecutive or non-consecutive DRUs). Although the design shown in FIG. 18 is simple, the UEs using the DRU pairs located in the TTIs cannot hear each other. Specifically, since the UE-A uses a DRU pair 1800, the UE-A cannot hear the UEs, i.e., UE-B, UE-C, UE-D, UE-E, and UE-F, using the DRU pairs 1802, 1804, 1806, 1808 and 1810 located in the same TTI as the DRU pair 1800.

Accordingly, the DRU linkage pattern may be more flexibly designed to link the DRUs having different time indexes and different frequency indexes as exemplified with the different linkage patterns 1820 and 1830 shown in FIG. 18.

Another efficient design when the number of sub-frames in the discovery period and the number of DRUs used in a single UE are given is to combine all possible cases of K DRUs having different time indexes.

FIG. 19 is a view illustrating another example of a cell-specific DRU linkage pattern in case K=2 according to an embodiment of the present disclosure.

Referring to FIG. 19, combinations possible when Nt=4 and K=2, i.e., $C_{Nt}^{K}=6$ possible linkage pairs, are (nt=0 and nt=1)(1900), (nt=0 and nt=2)(1902), (nt=0 and nt=3)(1904), (nt=1 and nt=2)(1906), (nt=1 and nt=3)(1908) and (nt=2 and nt=3)(1910).

As exemplified with the different linkage patterns 1920 and 1930 of FIG. 19, the DRUs in the same pair may use different frequency indexes, allowing different linkage patterns to be used for different cells. In this case, six UEs, each, may detect at least one DRU from the other UE, thus partially mitigating the half-duplex issue. Specifically, for example, for the UE-1A using the (1A, 1A') DRU pair, only the UE-2A using the (2A, 2A') DRU pair (1940) becomes a hidden UE. In other words, the UE-1A cannot hear discovery transmission only from the UE-2A and can hear discovery transmission from the other UEs.

FIG. 20 is a view illustrating an example of a DRU pair linkage pattern applied to SA transmission according to an embodiment of the present disclosure.

Referring to FIG. 20, the linkage pattern may apply also to SA transmission patterns in order to avoid the half-duplex issue. In particular, the pattern may apply to each of different UE groups, so that the UEs belonging to the same group may hear discovery therebetween. The pattern design may be influenced by the number of sub-frames for SA transmission.

Similarly, the SA linkage pattern shown in FIG. 25 may apply to DRU pair linkage patterns as well, which is exemplified in FIG. 26.

Figure 26A:
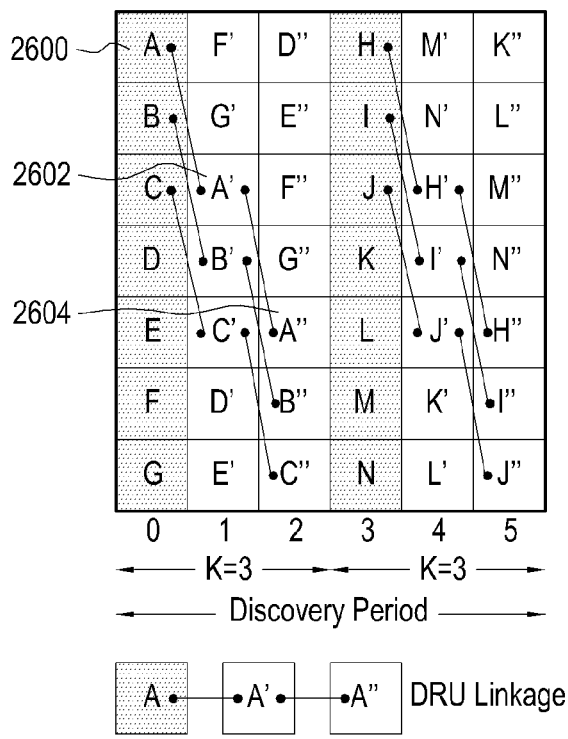
FIGS. 26A, 26B, and 26C are views illustrating examples of DRU linkage patterns in case K=3 according to various embodiments of the present disclosure.
Figure 26B:
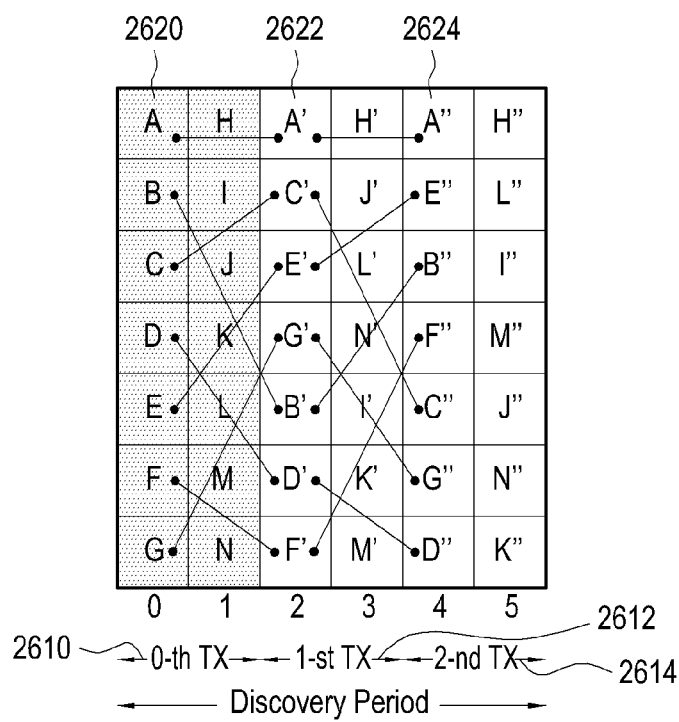
Figure 26C:
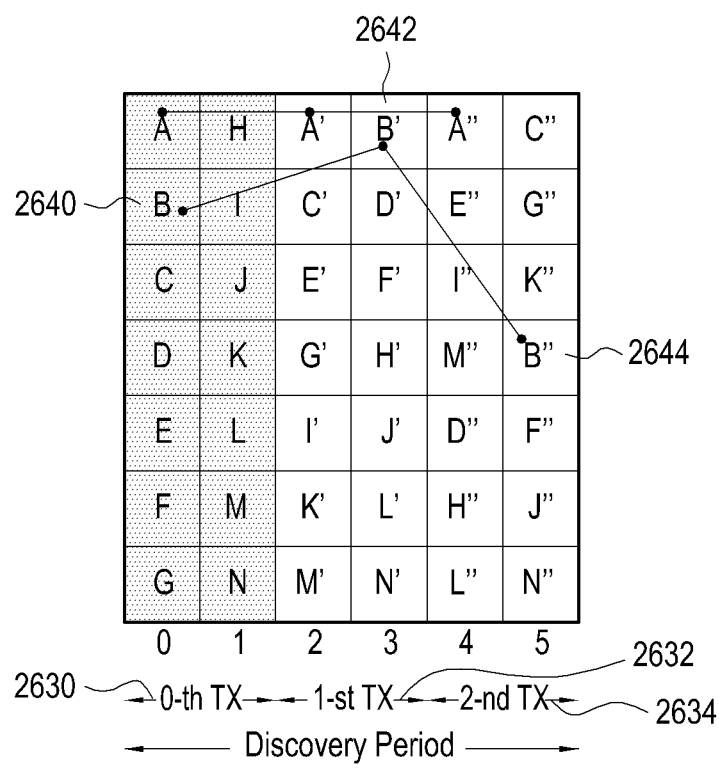

FIGS. 26A, 26B, and 26C are views illustrating examples of DRU linkage patterns in case K=3 according to various embodiments of the present disclosure.

FIGS. 26A to 26C exemplify the DRU linkage pattern corresponding to the SA linkage pattern shown in FIG. 25. It may be assumed that, when a DRU pair is given, the initial DRU transmission has an index (nt_0, nf_0). Here, nt_0 denotes the DRU index in the time domain, and nf_0 denotes the DRU index in the frequency domain. The kth repetitive DRU transmission in the same DRU pair is derived from the index of the initial DRU transmission.

In option 1 of FIG. 26A, the DRUs by the same UE always remain contiguous in the time domain. As an example, the linkages of the 0th DRU, first DRU, and second DRU of the UE, respectively, may be linkages of resource block A 2600 of the 0th sub-frame, resource block A' 2602 of the first sub-frame, and resource block A'' 2604 of the second sub-frame.

Here, the time and frequency index (nt_k, nf_k) of the kth DRU may be defined as follows.

$$\begin{cases} \text{nt\_k} = \mathrm{mod}(\text{nt\_0} + k, Nt) \\ \text{nf\_k} = \mathrm{mod}(a \times \text{nf\_0} + b \times k + c, Nf) \end{cases} \quad \text{Equation 10}$$

Here, a, b, and c are predefined parameters, which can be common to all cells or can be cell-specific. In the example of FIG. 26A, a=1, b=floor(Nf/K), c=0, which can be a typical set of parameters to be used.

Referring to option 2 of FIG. 26B, the 0th DRU transmission by the same UE uses the resources in the 0th transmission interval 2610, the first DRU transmission the resources in the first transmission interval 2612, and the second DRU transmission the resources in the second transmission interval 2614. As an example, the linkages of the 0th DRU, first DRU, and second DRU of the UE, respectively, may be linkages of resource block A 2620 of the 0th sub-frame, resource block A' 2622 of the second sub-frame, and resource block A'' 2624 of the fourth sub-frame.

Here, the index (nt_k, nf_k) of the kth DRU may be defined as follows.

$$\begin{cases} \text{nt\_k} = \mathrm{mod}(\text{nt\_0} + a \times K, Nt) \\ \text{nf\_k} = \mathrm{mod}\left(b \times \text{nf\_0} + c \times k \times \left\lfloor \frac{Nf}{2} \right\rfloor + d, Nf\right) \end{cases} \quad \text{Equation 11}$$

Here, a, b, c, and d are predefined parameters and are cell-specific.

In option 3 of FIG. 26C, the 0th DRU transmission by the same UE uses the resources in the 0th transmission interval 2630, the first DRU transmission the resources in the first transmission interval 2632, and the second DRU transmission the resources in the second transmission interval 2634. As an example, the linkages of the 0th DRU, first DRU, and second DRU of the UE, respectively, may be linkages of resource block B 2640 of the 0th sub-frame, resource block B' 2642 of the third sub-frame, and resource block B'' 2644 of the fifth sub-frame.

Here, the index of the kth DRU, (nt_k, nf_k), may be derived from the index of the (k−1)th DRU as follows.

$$\begin{cases} \text{nt\_k} = \mathrm{mod}\left(a \times \text{nf\_k1} + \left(\text{nt\_k1} - \frac{(k-1) \times Nt}{K}\right) \times Nf + b, \frac{Nt}{K}\right) + \frac{k \times Nt}{K} \\ \text{nf\_k} = \mathrm{mod}\left(\left\lfloor \frac{\text{nf\_k1} + \left(\text{nt\_k1} - \frac{(k-1) \times Nt}{K}\right) \times Nf}{Nt/K} \right\rfloor + c, Nf\right) \end{cases} \quad \text{Equation 12}$$

Here, a, b, and c are predefined parameters and are cell-specific.

Now, a design of a hopping pattern is described with reference to FIG. 21.

Since there may be several hidden UEs to a particular UE in the same discovery period, a hopping pattern to address the half-duplex issue may be used.

First, DRU hopping pattern is described.

Assuming that the UE transmits a discovery message in the DRU <nt, nf> in any discovery period, the DRU hopping pattern defines a DRU to be used by the UE in the subsequent discovery period, i.e., DRU <nt_next,nf_next>. Any hopping pattern to address the half-duplex issue may be put to use. DRU hopping attempts to address the half-duplex issue at a DRU level. In other words, DRU hopping enables detection of at least one DRU of a UE previously hidden (in the prior discovery period) in each discovery period.

Second, a linked DRU pair hopping pattern is described.

Unlike the DRU hopping pattern, the DRU pair hopping pattern aims to address the half-duplexing issue at a DRU pair level. When the UE transmits a discovery message in a DRU pair p in any discovery period, the DRU pair hopping pattern defines a rule to derive the DRU pair p_next to be used by the UE in the next discovery period. The DRUs in the predefined DRU pair p_next may be used for transmission of discovery messages.

Figure 21:
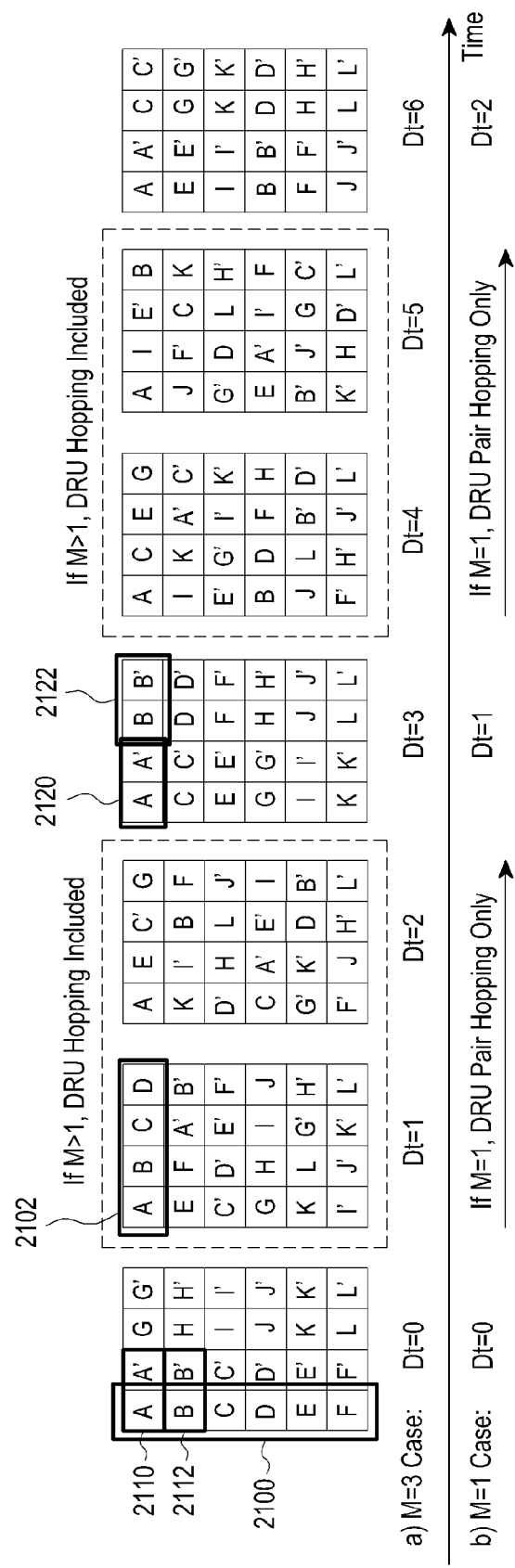
FIG. 21 is a view illustrating an example of D2D discovery resource hopping to which a hopping pattern applies according to an embodiment of the present disclosure.

FIG. 21 is a view illustrating D2D discovery resource hopping to which a hopping pattern applies according to an embodiment of the present disclosure.

Referring to FIG. 21, the DRU hopping rule is a sort of block interleaving style in which, e.g., reading is made from a column 2100, and writing is made to a row 2102. The DRU pair hopping rule may also be a kind of block interleaving style, but may enable pair-by-pair reading and writing. For example, an A-A' pair 2110 and a B-B' pair 2112 may be read, and an A-A' pair 2120 and a B-B' pair 2122 may be written.

In FIG. 21, the "a)" case indicates that, when M=3, DRU hopping and DRU pair hopping may be used together, and the "b)" case indicates that, when M=1, only DRU pair hopping is used.

The "b)" case (i.e., M=1, and only DRU pair hopping is used) may be set as default. Accordingly, hopping may apply to first DRU transmission, and the (K−1) DRUs in the same DRU pair may be obtained by the DRU linkage rule. The hopping pattern for the first DRU transmission may be described as follows.

$$\begin{cases} \text{next\_nt} = \text{mod}\left(a \times nf + nt \times Nf + b, \dfrac{Nt}{K}\right) \\ \text{next\_nf} = \text{mod}\left(\left\lfloor \dfrac{nf + nt \times Nf}{Nf/K} \right\rfloor + c, Nf\right) \end{cases} \quad \text{Equation 13}$$

Here, nt denotes the logical time index of the first transmission in one discovery period, and of denotes the frequency index of the first transmission in one discovery period. Here, a, b, and c are predefined parameters and are cell-specific.

Use of time hopping or frequency hopping is possible as well. The hopping case may be signaled by a higher layer. For example, two bits may be used to indicate the hopping case. For example, '00' denotes frequency and time hopping, '01' time hopping only, '10' frequency hopping only, and '11' no hopping.

Unless resource allocation and resource hopping are controlled by the eNB (i.e., if the UE selects and access a DRU on its own), only DRU pair hopping may be used. The UE selects a DRU pair to access in one discovery period, and may select another DRU pair in the subsequent discovery period. The following options may be used in selecting DRUs.

In option 1, the UE selects first DRUs with the same probability from among all the first DRUs, and the other DRUs in the same DRU pair are derived from the DRU linkage pattern. This is like selecting DRU pairs with the same probability from among all the DRU pairs.

In option 2, the UE selects first DRUs with the same probability from among first DRUs of a low power level (e.g., having power lower than X dBm), and the other DRUs in the same DRU pair are derived from the DRU linkage pattern.

In option 3, the UE selects first DRUs with the lowest power level, and the other DRUs in the same DRU pair are derived from the DRU linkage pattern.

In option 4, the UE selects DRU pairs with the same probability from among DRUs with a low power level (i.e., the average power of the DRUs belonging to the same DRU pair is lower than X dBm).

In option 5, the UE selects the DRU pair with the lowest power level.

A discovery method by a UE is now described with reference to FIGS. 22 to 24.

If a cell-specific discovery pattern is required in inter-cell discovery, a proposed method may apply to make a design in different manners. In order for a discovery pattern to be cell-specific, parameters, e.g., DRU linkage pattern, DRU hopping pattern, DRU pair hopping pattern, and DRU pair hopping interval, may be used. Accordingly, there may be many possible approaches to design cell-specific hopping patterns. For example, although the DRU linkage pattern and the DRU hopping pattern may be common to each cell, the DRU pair hopping pattern is cell-specific, and the DRU pair hopping interval may also be cell-specific. As per system requirements, different hopping patterns may be designed.

Figure 22:
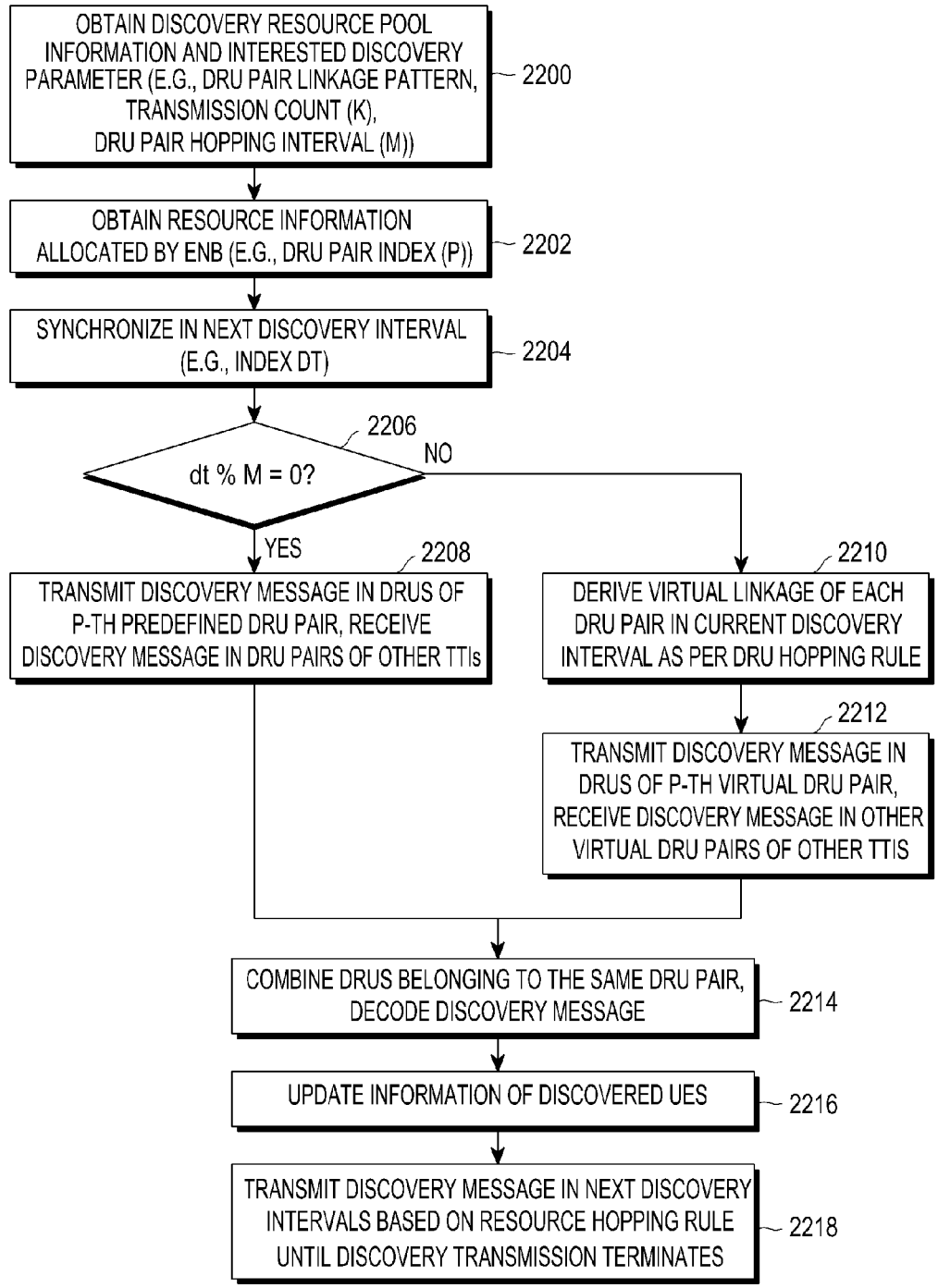
FIG. 22 is a view illustrating an example of a procedure in which a UE receives a resource allocation from an evolved Node B (eNB) and transmits an initial discovery message according to an embodiment of the present disclosure.

FIG. 22 is a view illustrating an example of a procedure in which a UE receives a resource allocation from an eNB and transmits an initial discovery message according to an embodiment of the present disclosure.

Referring to FIG. 22, the UE obtains discovery resource pool and relevant discovery parameters from system information at operation 2200. The UE may obtain, as examples of the parameters, at least one of a DRU pair linkage pattern, a transmission count (K), and a DRU pair hopping interval (M). The UE obtains information on resources allocated by the eNB at operation 2202. The UE may obtain a DRU pair index (p) as an example of the resource information.

The UE performs synchronization in a subsequent discovery period at operation 2204. As an example, the UE may perform synchronization using index dt.

The UE checks if the remainder obtained by dividing dt by M is 0 at operation 2206.

In case it is checked at operation 2206 that the remainder is 0, the UE may transmit a discovery message in the DRUs of the p-th predefined DRU pair and receive a discovery message in other DRU pairs of other TTIs at operation 2208.

In case it is checked at operation 2206 that the remainder is not 0, the UE derives the virtual linkage of each DRU pair in the current discovery period as per the DRU hopping rule at operation 2210. The UE transmits a discovery message in the DRUs of the p-th virtual DRU pair and receives a discovery message in other DRU pairs of other TTIs at operation 2212.

The UE combines the DRUs belonging to the same DRU pair and decodes the discovery message at operation 2214.

The UE updates the information of discovered UEs at operation 2216.

Until the discovery transmission is terminated, the UE transmits discovery messages in subsequent discovery periods based on the resource hopping rule at operation 2218.

Figure 23:
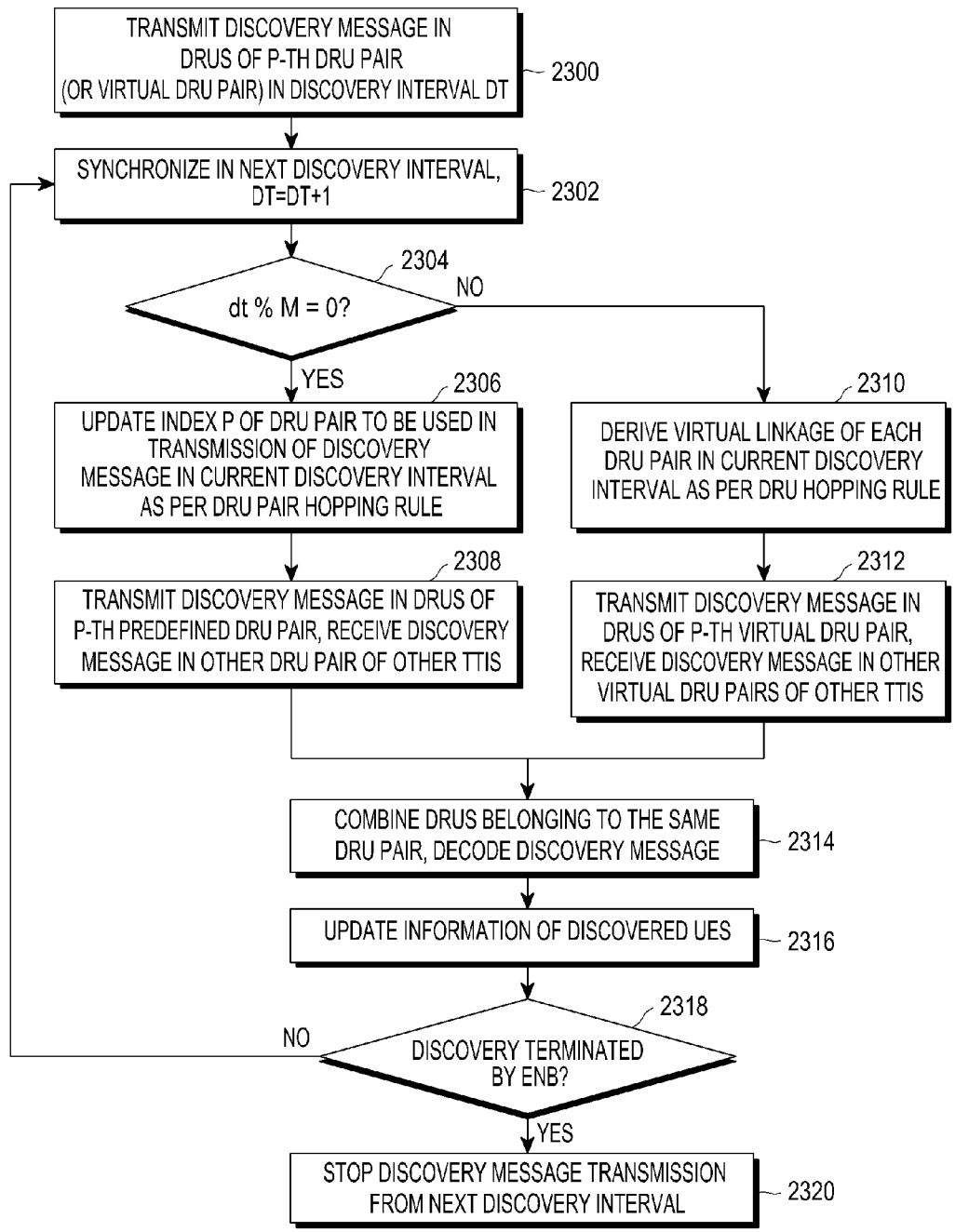
FIG. 23 is a view illustrating an example of a discovery resource access procedure when a UE transmits a discovery message in a next discovery period according to an embodiment of the present disclosure.

FIG. 23 is a view illustrating an example of a resource access procedure when a UE transmits a discovery message in a next discovery period according to an embodiment of the present disclosure.

Referring to FIG. 23, the UE transmits discovery messages in the DRUs of the p-th DRU pair (or virtual DRU pair) in discovery period dt at operation 2300.

The UE performs synchronization in the subsequent discovery period and increases dt by one at operation 2302.

The UE checks if the remainder obtained by dividing dt by M is 0 at operation 2304.

If it is checked at operation 2304 that the remainder is 0, the UE updates index p of the DRU pair to be used for transmission of a discovery message in the current discovery period as per the DRU pair hopping rule at operation 2306. The UE may transmit a discovery message in the DRUs of the p-th predefined DRU pair and receive a discovery message in other DRU pairs of other TTIs at operation 2308.

In case it is checked at operation 2304 that the remainder is not 0, the UE derives the virtual linkage of each DRU pair in the current discovery period as per the DRU hopping rule at operation 2310. The UE may transmit a discovery message in the DRUs of the p-th virtual DRU pair and receive a discovery message in other DRU pairs of other TTIs at operation 2312.

The UE may combine the DRUs belonging to the same DRU pair and decode the discovery message at operation 2314.

The UE updates the information of discovered UEs at operation 2316.

The UE checks if the discovery is terminated by the eNB at operation 2318.

In case it is checked at operation 2318 that the discovery is terminated by the eNB, the UE stops transmitting discovery messages from the next discovery period at operation 2320.

In case it is checked at operation 2318 that the discovery is not terminated by the eNB, the UE may perform a discovery operation of a subsequent discovery time (dt=dt+1) from operation 2302.

Figure 24:
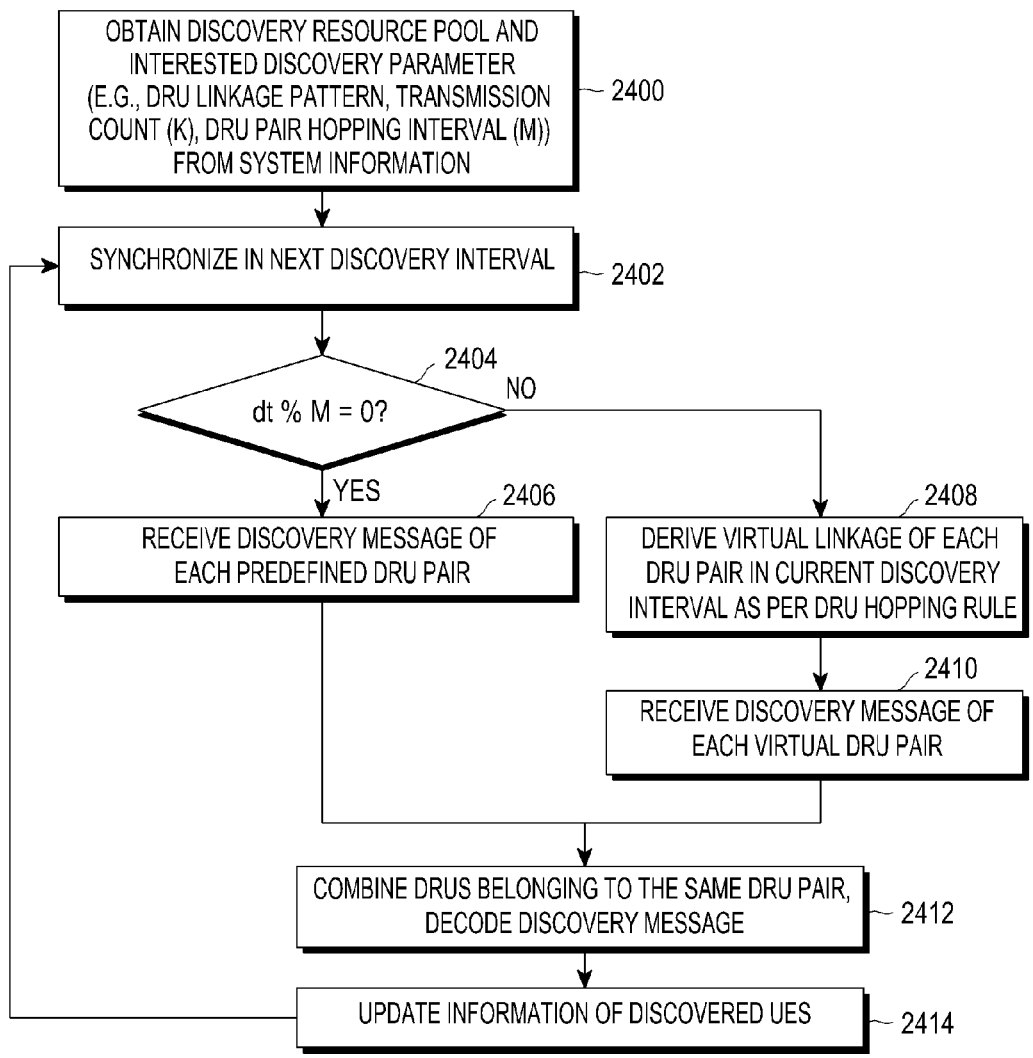
FIG. 24 is a view illustrating an example of d discovery message receiving procedure by a UE according to an embodiment of the present disclosure.

FIG. 24 is a view illustrating an example of d discovery message receiving procedure by a UE according to an embodiment of the present disclosure.

Referring to FIG. 24, the UE obtains discovery resource pool and relevant discovery parameters from system information at operation 2400. The UE may obtain, as examples of the parameters, at least one of a DRU linkage pattern, a transmission count (K), and a DRU pair hopping interval (M).

The UE performs synchronization in a subsequent discovery period at operation 2402.

The UE checks if the remainder obtained by dividing dt by M is 0 at operation 2404.

In case it is checked at operation 2404 that the remainder is 0, the UE receives the discovery message of each predetermined DRU pair at operation 2406.

In case it is checked at operation 2404 that the remainder is not 0, the UE may derive the virtual linkage of each DRU pair in the current discovery period as per the DRU hopping rule at operation 2408 and receive the discovery message of each virtual DRU pair at operation 2410.

The UE may combine the DRUs belonging to the same DRU pair and decode the discovery message at operation 2412.

The UE may update the information of discovered UEs at operation 2414 and may perform the operation from operation 2402 in order to perform the operation in the subsequent discovery period.

Figure 10:
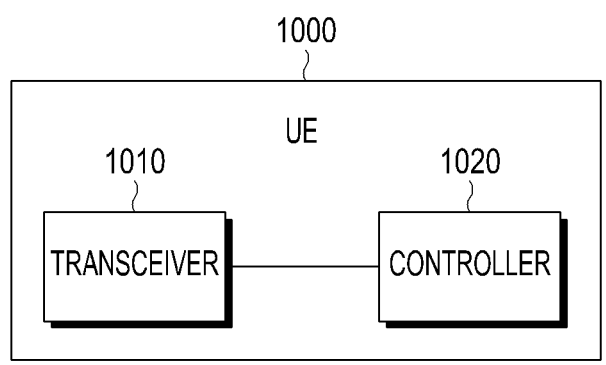
FIG. 10 is a view illustrating an example of a configuration of a D2D UE according to an embodiment of the present disclosure.

FIG. 10 is a view illustrating an example of a configuration of a D2D UE according to an embodiment of the present disclosure.

Referring to FIG. 10, the D2D UE 1000 may include a communicating unit 1010 that enables communication with an eNB or other D2D UEs and a controller 1420 for controlling the communication unit 1010. The communication unit 1010 and the controller 1020 may be implemented in one device.

The controller 1020 is a component that implements acquisition of resource allocation information of the D2D UE and signal transmission as described above. In other words, all the operations of the UE described above in connection with FIGS. 3 to 30 may be appreciated to be performed by the controller 1420.

It should be noted that the examples of resource allocation, signaling between the eNB and UE, acquisition and transmission of UE's information, device configuration, SA linkage patterns, DRU linkage patterns, and operations of the in-coverage UE transmitter/receiver, as illustrated in FIGS. 3 to 30, are not intended to limit the scope of the present disclosure. In other words, all the procedures, signaling, components, or operations illustrated in FIGS. 3 to 30 should not be construed as essential components to practice the present disclosure, and the present disclosure may be rather implemented with only some of the components without departing from the gist of the present disclosure.

The above-described operations may be realized by equipping a memory device retaining their corresponding codes in the eNB of the communication system or any component of the UE. That is, the controller in the eNB or UE may execute the above-described operations by reading and executing the program codes stored in the memory device by a processor or central processing unit (CPU).

As described herein, various components or modules in the entity, function, eNB, load manager, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or application-specific integrated circuits (ASICs).

As is apparent from the foregoing description, according to the present disclosure, resource allocation may be efficiently performed for D2D UEs in various manners, and flexible resource allocation signaling may be implemented.

Further, a D2D discovery resource allocation method according to the present disclosure may enable neighbor UEs to discover each other as fast as possible and allow for discovery of as many UEs as possible.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing device-to-device (D2D) communication by a user equipment (UE) in a wireless communication system, the method comprising:

transmitting a first discovery message using a first resource; and transmitting at least one repetitive discovery message of the first discovery message using at least one second resource, wherein the at least one second resource for the repetitive discovery message is determined based on at least one of a time index and a frequency index of the first resource for the first discovery message, and wherein a frequency index of the at least one second resource is determined based on a modulo Nf operation on a sum of the frequency index of the first resource and a result of a multiplication operation of a preset value and a number of a repetitive transmission of the first discovery message, wherein the Nf denotes a number of resources in a resource pool.

2. The method of claim 1, wherein each of the first resource and the at least one second resource contains 2 resource blocks (RBs) which are contiguous in a frequency domain.

3. The method of claim 1, wherein the frequency index of the at least one second resource is increased or decreased by a multiple of the preset value from the frequency index of the first resource.

4. The method of claim 1, wherein the frequency index of the at least one second resource for a k-th transmission of the discovery messages is determined by the following equation, $nf\_k = \mod(a \times nf_{13}0 + b \times k + c, Nf)$, wherein nf_k denotes a frequency index of the k-th transmission, k denotes a number of retransmission of the discovery messages, a, b and c are each preset values, and nf_0 denotes the frequency index of the first resource.

5. The method of claim 4, wherein b is a floor function of Nf being divided by a number of retransmission of the discovery messages.

6. The method of claim 1, wherein information of the resource pool is received on a system information block (SIB).

7. The method of claim 1, wherein the first resource for the first discovery message and the second resource for the repetitive discovery message are contiguous in a time domain.

8. A user equipment (UE) for device-to-device (D2D) communication in a cellular communication system, the UE comprising:

a controller; and a transceiver, controlled by the controller, configured to:
  transmit a first discovery message using a first resource; and
  transmit at least one repetitive discovery message of the first discovery message using at least one second resource, wherein the at least one second resource for the repetitive discovery message is determined based on at least one of a time index and a frequency index of the first resource for the first discovery message, and wherein a frequency index of the at least one second resource is determined based on a modulo Nf operation on a sum of the frequency index of the first resource and a result of a multiplication operation of a preset value and a number of a repetitive transmission of the first discovery message, wherein the Nf denotes a number of resources in a resource pool.

9. The UE of claim 8, wherein each of the first resource and the at least one second resource contains 2 resource blocks (RBs) which are contiguous in a frequency domain.

10. The UE of claim 8, wherein the frequency index of the at least one second resource is increased or decreased by a multiple of the preset value from the frequency index of the first resource.

11. The UE of claim 8, wherein the frequency index of the at least one second resource for a k-th transmission of the discovery messages is determined by the following equation, $nf\_k = \mod(a \times nf_{13}0 + b \times k + c, Nf)$, wherein nf_k denotes a frequency index of the k-th transmission, k denotes a number of retransmission of the discovery messages, a and c are each preset values, and nf_0 denotes the frequency index of the first resource.

12. The UE of claim 11, wherein b is a floor function of Nf being divided by a number of retransmission of the discovery messages.

13. The UE of claim 8, wherein information of the resource pool is received on a system information block (SIB).

14. The UE of claim 8, wherein the first resource for the first discovery message and the second resource for the repetitive discovery message are contiguous in a time domain.

* * * * *